(12) United States Patent
Yamada et al.

(10) Patent No.: US 7,636,544 B2
(45) Date of Patent: Dec. 22, 2009

(54) BROADCAST PROGRAM RECORDING METHOD, COMMUNICATION CONTROL DEVICE, AND MOBILE COMMUNICATION DEVICE

(75) Inventors: Shohei Yamada, Chiba (JP); Kazuya Iwasaki, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 951 days.

(21) Appl. No.: 10/660,756

(22) Filed: Sep. 12, 2003

(65) Prior Publication Data

US 2004/0052504 A1    Mar. 18, 2004

(30) Foreign Application Priority Data

Sep. 13, 2002   (JP)   ............... 2002-268617
Dec. 11, 2002   (JP)   ............... 2002-359551

(51) Int. Cl.
*H04H 20/71* (2008.01)

(52) U.S. Cl. .................. 455/3.01; 386/21; 386/113; 725/142

(58) Field of Classification Search ....... 455/3.01–3.06, 455/556.1; 725/73, 74, 86, 55, 89, 92, 142, 725/145; 386/68, 83, 98, 21, 113
See application file for complete search history.

(56) References Cited

U.S. PATENT DOCUMENTS

| | | | |
|---|---|---|---|
| 5,150,384 A * | 9/1992 | Cahill | ............ 375/375 |
| 5,706,388 A | 1/1998 | Isaka | |
| 7,054,660 B2 * | 5/2006 | Lord | ............ 455/558 |
| 7,065,333 B2 * | 6/2006 | Engstrom | ............ 455/184.1 |
| 2001/0038690 A1 | 11/2001 | Palmer et al. | |
| 2002/0013143 A1 * | 1/2002 | Lee et al. | ............ 455/412 |
| 2004/0019909 A1 | 1/2004 | Takahashi | |

FOREIGN PATENT DOCUMENTS

| | | |
|---|---|---|
| DE | 199 62 922 | 6/2000 |
| EP | 1 161 088 | 12/2001 |
| GB | 2 343 074 | 4/2000 |
| GB | 2 347 051 | 8/2000 |
| JP | 7-130150 | 5/1995 |
| JP | 11-068686 | 3/1999 |
| JP | 11-136651 | 5/1999 |
| JP | 11136202 A * | 5/1999 |
| JP | 2001-238157 | 8/2001 |

(Continued)

OTHER PUBLICATIONS

Chinese Office Action mailed Mar. 4, 2005 in corresponding Chinese application No. 031272959.

(Continued)

*Primary Examiner*—Raymond S Dean
(74) *Attorney, Agent, or Firm*—Nixon & Vanderhye, PC

(57) ABSTRACT

Disclosed is a broadcast recording method, information terminal, communication device and broadcast recording system for resolving the problem of missing programs when radio wave difficulties occurs or an electronic communication is made during viewing or listening to a program. When an incoming or outgoing call is made in an information terminal containing broadcast signal receiving functions and communication functions, the broadcast signal currently being received is recorded automatically. When a problem or interruption in receiving the broadcast signal is detected, a command signal is automatically sent to the recording server in order to record the broadcast signal currently being received.

12 Claims, 11 Drawing Sheets

FOREIGN PATENT DOCUMENTS

| | | | |
|---|---|---|---|
| JP | 2001-333334 | | 11/2001 |
| JP | 2002-27142 | | 1/2002 |
| JP | 2002-77323 | A | 3/2002 |
| JP | 2002-118810 | A | 4/2002 |
| JP | 2002-185900 | | 6/2002 |
| JP | 2002-185941 | | 6/2002 |
| JP | 2002185900 | A * | 6/2002 |
| JP | 2003-110955 | | 4/2003 |
| JP | 2003-111004 | | 4/2003 |
| KR | 2000-0047806 | | 7/2000 |
| WO | 01/31915 | | 3/2001 |
| WO | 01/30046 | | 4/2001 |
| WO | 01/67775 | | 9/2001 |
| WO | 01/82601 | | 11/2001 |

OTHER PUBLICATIONS

Office Action in JP 2002-268617, May 8, 2007.
EP Search Report for EP 03020300.4, Jun. 29, 2007.
Search Report in European Application No. 07019574.8 dated Jan. 24, 2008.
Office Action in Korean Application No. 10-2006-0050080, dated Dec. 5, 2008.

* cited by examiner

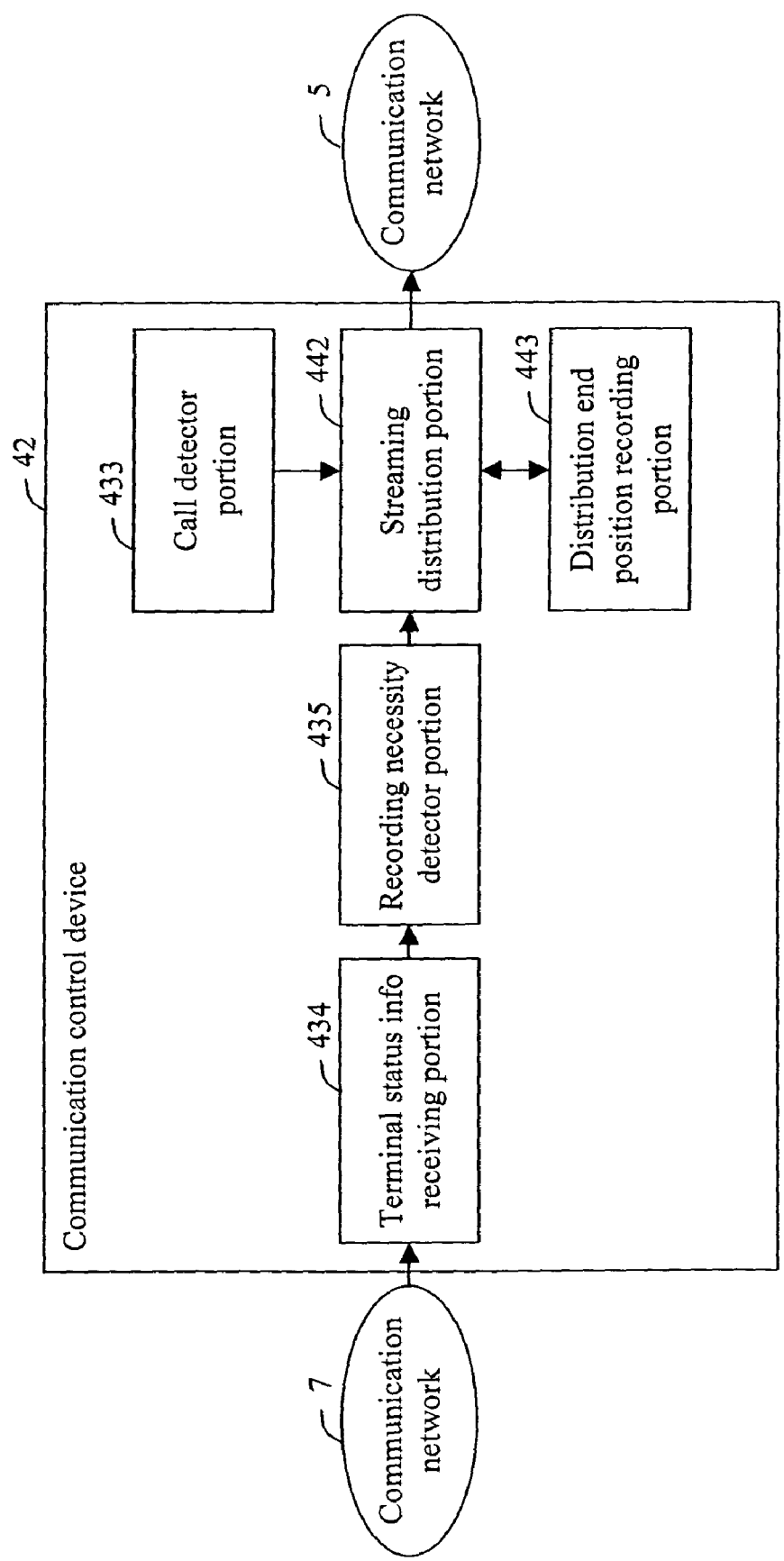

US 7,636,544 B2

BROADCAST PROGRAM RECORDING METHOD, COMMUNICATION CONTROL DEVICE, AND MOBILE COMMUNICATION DEVICE

FIELD OF THE INVENTION

The present invention relates to a method for recording broadcast programs and a recording system and in particular relates to a method and device for recording broadcast television programs over a communication system.

BACKGROUND OF THE INVENTION

When the telephone call is received while viewing or listening to a television broadcast program, the viewer usually must stop viewing the program, lower the volume, and handle the telephone call. The program therefore cannot be viewed or heard during the telephone call or communication. To eliminate this inconvenience methods have been proposed for automatically recording the broadcast television program when a telephone call is received.

A method is disclosed in JP-A No. 333334/2001 for automatically recording a currently viewed television program when an incoming call to a fixed telephone is detected on a television receiver with an internal modem. In this document, a communication antenna is installed on the television receiver and when an incoming call to a cellular telephone is detected, the current viewed broadcast television program is recorded.

When a telephone call is received while using a home electrical appliance, usually the electrical appliance must be stopped or the power turned off and the telephone call then taken. When the telephone call ends, the user then returns switches on the electrical appliances to their original (on) positions. To eliminate this inconvenience, methods have been proposed to automatically turn off the switches of home electrical appliances currently in use when a telephone call is received.

A method is disclosed in JP-A No. 27142/2002 for temporarily turning off electrical appliances automatically or outputting a signal to turn off the power from the telephone, when a telephone call is received while home electrical appliances are in use. This method of the related art in this way eliminates tasks such as turning off currently used electrical appliances until the incoming telephone call is handled.

In recent years, a remarkable amount of progress has been made in the functions contained in mobile communications devices including portable information terminals such as cellular telephones, PHS (Personal Handy-Phone System), and PDA (Personal Digital Assistants) having card communication functions. In addition to communication functions, these mobile communication devices are also capable of receiving television (hereafter simply abbreviated to TV) broadcasts such as ground wave digital broadcasts.

Utilizing mobile communication devices also makes possible services over the Internet such as operating recording equipment in one's own home, and services for recording, playback, or distribution of TV programs.

One example of a service system using these types of mobile communication devices is the following system.

In a TV program scheduling system disclosed in JP-A No. 238157/2001, the user makes use of a portable information terminal (mobile communication device) to set a particular program for recording on a program scheduling server that schedules the recording on a user home video server.

Further, a TV broadcast recording re-distribution system disclosed in JP-A No. 185900/2002 allows receiving a recording re-distribution service for TV broadcasts on a portable information terminal (mobile communication device) by utilizing a TV broadcast recording redistribution station.

However, in the technology of the related art disclosed in JP-A No. 333334/2001 and JP-A No. 27142/2002, the recording is stopped after the telephone call ends but playing back the recording must be performed manually. There are also no countermeasures when receiving of the TV broadcast radio waves is disabled due to radio wave difficulties.

The program scheduling system disclosed in JP-A No. 238157/2001 required connecting the home video server to the program scheduling server over public telephone lines by a portable information server. The task of setting the program to be recorded on the program scheduling server is also necessary.

Therefore, a problem occurred with this technology when setting a program for recording on the program scheduling server on the portable information terminal. More specifically, when a telephone call or communication is received, or the portable information terminal is subjected to radio wave difficulties, or batteries on the portable information terminal itself were low, the user is then unable to set the program for recording on the program scheduling server and therefore missed viewing the desired program.

In the TV broadcast re-distribution system disclosed in JP-A No. 185900/2002 the program reception on the information terminal is promptly cut off when a telephone call is received, or when radio wave difficulties occurred in the information communication terminal. This technology therefore had the problem that user is required to memorize what program is missed each time and time is required to search for the desired program for viewing.

SUMMARY OF THE INVENTION

The broadcast recording method of the present invention utilizes a terminal device having broadcast signal receiving function and communication function and includes; a call detection step for detecting an incoming or outgoing call during receiving of a broadcast signal; a receiving failure detection step for detecting a failure to receive the broadcast signal during receiving of the broadcast; and a recording step for recording the broadcast signal when an incoming or outgoing call is detected by the call detection step or when a failure of receiving the broadcast signal is detected by the receiving failure detection step.

In the present invention, the communication device comprises a broadcast signal receiving portion for receiving the broadcast signal, a receiving-status detector portion for detecting the broadcast signal receiving status, a receiving signal recording portion for recording the broadcast receiving information acquired from the broadcast signal, an incoming-outgoing call detector portion for detecting an incoming or outgoing call, or termination of a call, and a recording-start/recording-stop/playback command information generator portion for generating the recording-start, recording-stop, and playback-command information; wherein the recording-start/recording-stop/playback command information generator portion sends recording command information for the broadcast signal to an external recording server via a communication network when a broadcast signal receiving failure is detected by the receiving-status detector portion, and sends the recording command information for the broadcast signal to an external recording server via a communication network when an incoming or outgoing call is detected by the incoming-outgoing call detector portion and/or notifies the receiving signal recording signal portion about the broadcast signal recording command information.

In the present invention, the recording server comprises a broadcast signal receiving portion for receiving the broadcast signal; a receiving signal recording portion for recording broadcast receiving information acquired from the broadcast signals, a control portion for reporting recording commands or playback commands to the receiving signal recording portion when a recording command or a playback command are received over a communication network; wherein the recording server sends the playback information over the communication network.

In the present invention, a broadcast recording system comprises a recording server containing a recording device and an information terminal device having broadcast signal functions and communication functions; wherein the recording server records the broadcast information being received by the information terminal device when a failure of receiving is detected during receiving of the broadcast signal by the information terminal device.

The present invention provides a broadcast program recording method for recording a broadcast program viewed or recorded on a mobile communication device containing communication functions or broadcast receiving functions by utilizing a program recording device. This method comprises:

a video-recording channel information receiving step for receiving as video-recording channel information, the broadcast program channel information sent from a mobile communication device and recorded or viewed on that communication device, a user control information recording step for recording video-recording channel information received in the video-recording channel information receiving step that corresponds to a user or a mobile communication device, an interruption source detecting step for detecting the cause that the user stops recording or viewing a program on the mobile communication device, a recording information command generating step for generating recording command information containing video-recording channel information of the user or mobile terminal device that is recorded in the user control information recording step, when an interruption source is detected in the interruption source detecting step, and a recording command information transmitting step for sending the recording command information generated in the recording information command generating step to the program recording device and for recording the video-recording channel information of the broadcast program in the program recording device.

The recording method for broadcast programs of the present invention for recording broadcast programs distributed on a communication line by streaming to a mobile communication device containing a streaming broadcast receiving function, wherein said method comprises:

a distribution step for streaming distribution of broadcast programs via a communication line to a mobile communication device;

an interruption source detection step for detecting the cause of interruption of receiving of broadcast programs distributed on a communication line to the mobile communication device;

a distribution stop step for receiving the interruption source detection from the interruption source detection step, for stopping the streaming distribution to the mobile communication device and for recording the ending position of the currently ended streaming;

an interruption source end detection step for detecting the end of source status detected in the interruption source detection step; and a distribution restart step for receiving the interruption end detection from the interruption source end detection step, and for restarting the streaming distribution of the broadcast program from the streaming ending position recorded in the distribution stop step.

In the present invention, a communication control device connectable via a communication line to a program recording device containing broadcast receiving functions and a mobile communication device containing broadcast receiving functions and communication functions, wherein said communication control device comprises:

video-recording channel information receiving means for receiving as video-recording channel information, the broadcast program channel information sent from a mobile communication device and viewed or recorded on a mobile communication device;

user control information recording means for recording the video-recording channel information received by the video-recording channel information receiving means, corresponding to users or mobile communication devices;

interruption source detection means for detecting the cause of interruption of viewing or recording of the broadcast program on the mobile communication device;

recording information command generating means for generating recording command information containing video-recording channel information based on the video-recording channel information of the user or mobile terminal device that is recorded in the user control information recording means, when an interruption source is detected in the interruption source detection means; and recording command information transmitting means for sending the recording command information generated in the recording information command generating means to the program recording device, and for recording the video-recording channel information of the broadcast program into the program recording device.

In the present invention, a communication control device connectable via a communication line to a program recording device containing broadcast receiving functions and a mobile communication device containing broadcast receiving functions and communication functions, wherein said communication control device comprises:

video-recording channel information receiving means for receiving as video-recording channel information, the broadcast program channel information sent from a mobile communication device and viewed or recorded on a mobile communication device;

user control information recording means for recording the video-recording channel information received by the video-recording channel information receiving means, corresponding to users or mobile communication devices;

call detection means for detecting an incoming or outgoing call for the mobile communication device;

recording information command generating means for accepting the detection of the outgoing or incoming call on the mobile communication device by the call detection means, and for generating the recording command information containing video-recording channel information based on the video-recording channel information of the mobile terminal device recorded in the user control information recording means; and recording command information transmitting means for sending the recording command information generated in the recording information command generating means to the program recording device, and for storing the video-recording channel information of the broadcast program.

In the present invention, a communication control device connectable via a communication line to a program recording device containing broadcast receiving functions and a mobile communication device containing broadcast receiving functions and communication functions, wherein said communication control device comprises:

video-recording channel information receiving means for receiving as video-recording channel information, the broadcast program channel information sent from a mobile communication device and viewed or recorded on a mobile communication device;

user control information recording means for recording the video-recording channel information received by the video-recording channel information receiving means, corresponding to the users or mobile communication devices;

terminal status information receiving means for receiving terminal status information showing the terminal status of its own device reported from a mobile communication device;

recording necessity detection means for detecting the necessity level for recording a broadcast program viewed or recorded on the mobile communication device, from terminal status information received by the terminal status information receiving means;

recording information command generating means for accepting detection results of the recording necessity detection means, and for generating the recording command information containing video-recording channel information based on the video-recording channel information of the user or mobile terminal device recorded in the user control information recording means; and recording command information transmitting means for sending the recording command information generated in the recording information command generating means to the program recording device, and for recording the video-recording channel information of the broadcast program.

In the present invention, a communication control device for streaming distribution of a broadcast program via a communication line to a mobile communication device containing streaming broadcast receiving functions, comprises:

interruption source detection means for detecting the status of the mobile communication device causing interruption of receiving of the broadcast program by streaming distribution;

interruption source end detection means for detecting the end of interruption source detected by the interruption source detection means;

distribution end position recording means for recording the streaming position distributed to the mobile communication device; and streaming distribution means for receiving the interruption source detection from the interruption source detection means, and for stopping the streaming distribution to the mobile communication device and, along with recording the stream position at the end of the current stream distribution in the position recording means, for receiving the interruption source end detection from the interruption source end detection means and for restarting the streaming distribution from the distribution end stream position recorded in the position recording means.

In the present invention, a communication control device for streaming distribution of a broadcast program via a communication line to a mobile communication device containing a streaming broadcast receiving functions, comprises:

call detection means for detecting an incoming or outgoing call on the mobile communication device during streaming distribution of a broadcast program over a communication line;

call termination detection means for detecting termination of a call from an incoming or outgoing call detected by said call detection means;

distribution end position recording means for recording the stream position distributed to the mobile communication device; and streaming distribution means for receiving detection of the incoming or outgoing call on the mobile communication device from the call detection means, and for stopping the streaming distribution to the mobile communication device, and along with recording the stream position at the end of the current stream distribution by the position recording means, for receiving detection of call termination of incoming or outgoing call by the call termination detection means, and for restarting the streaming distribution from the distribution end stream position recorded in the position recording means.

In the present invention, a communication control device for streaming distribution of a broadcast program via a communication line to a mobile communication device containing a streaming broadcast receiving function, comprises:

terminal status information receiving means for receiving terminal status information showing the terminal status of its own device reported from a mobile communication device;

recording necessity detection means for detecting the necessity level for recording a broadcast program viewed or recorded on that mobile communication device, from terminal status information received by the terminal status information receiving means;

recording necessity end detection means for detecting canceling of the necessity for recording a broadcast program viewed or recorded on that mobile communication device, from terminal status information received by the terminal status information receiving means;

distribution end position recording means for storing the stream position distributed to the mobile communication device; and streaming distribution means for receiving detection from the recording necessity detection means, and for stopping the streaming distribution to the mobile communication device and, along with recording the stream position at the end of the current stream distribution in the position recording means, for receiving detection from the recording necessity end detection means, and for restarting the streaming distribution from the distribution end stream position recorded by the position recording means.

The mobile communication device of the present invention that receives TV broadcasts is capable of automatically recording programs being viewed or heard when problems such as incoming calls or outgoing calls or radio wave difficulties have made viewing the TV broadcast impossible and therefore has the advantage of allowing that program to be viewed or heard later on.

The mobile communication device of the present invention that receives TV broadcasts is capable of automatically recording programs being recorded or viewed onto a program recording device, even when a source occurs on the mobile communication device and the viewing or recording must be stopped, so the broadcast program that is missed can be viewed or heard later on. The user therefore need not worry about the currently viewed or recorded program and can therefore respond when a source status occurs in the mobile communication device and the viewing or a recording of a program must be stopped.

In the present invention, during recording or viewing of a broadcast program received by streaming distribution to a mobile communication device containing a streaming broadcast receiving function, the streaming position of a distributed stream is automatically recorded onto the distribution end position recording means, even when a source status occurs in the mobile communication device to stop the viewing or recording of that program. Though the streaming distribution does stop, if the mobile communication device source status causing interruption of program viewing or recording ends (is canceled), then the following streaming distribution can automatically restart from the stream distribution end position and so the broadcast program that is missed can be viewed or heard later on. The user therefore need not worry about (missing) the currently viewed or recorded program and can therefore respond when a source status occurs in the mobile communication device and the viewing or a recording of a program must be stopped. Also, if the source status of the mobile communication device is canceled, then streaming distribution automatically restarts from the position where viewing or recording of the stream is stopped, so that there is no need to receive the streaming distribution from the start of the program.

BRIEF DESCRIPTION OF THE DRAWINGS

FIG. 11 is a block diagram showing a third embodiment of the communication control device of the present invention.

DETAILED DESCRIPTION OF THE PREFERRED EMBODIMENTS

Figure 1:
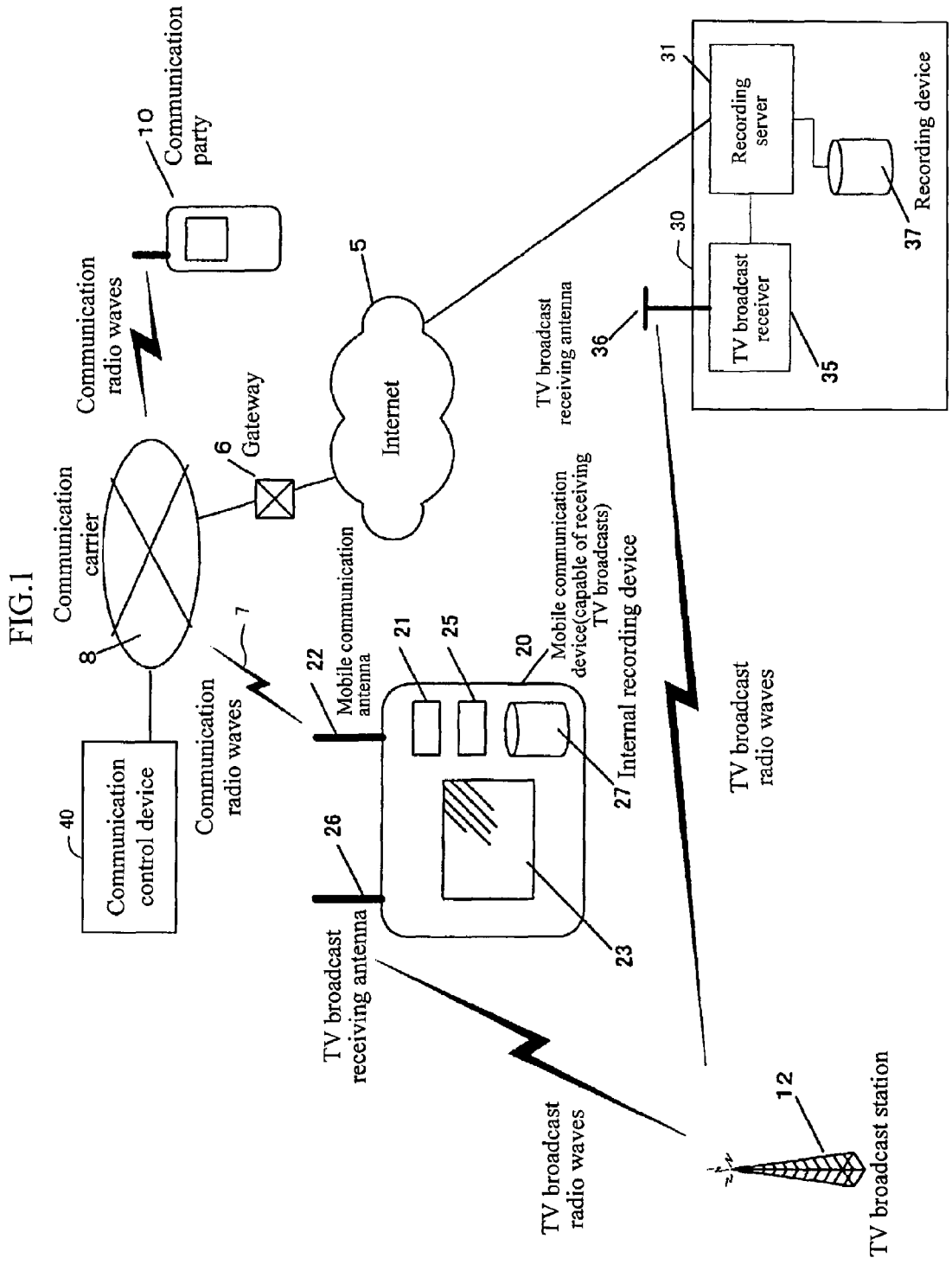
FIG. 1 is a concept diagram showing the recording system used in the mobile communication device of the present invention.

An embodiment of the television (hereafter abbreviated to TV) broadcast program recording system of the present invention is described next while referring to FIG. 1. The recording system for TV broadcast programs in this embodiment comprises a mobile communications device 20 capable of receiving TV broadcasts, a program recording device 30 for recording TV broadcast programs, a communication control device 40 controlled by a communication carrier 8, and a communication network connecting these components. This communication network as shown in FIG. 1, comprises a gateway 6 connecting the communication carrier 8 with the program recording device 30, as well as an Internet 5, and a public wireless line 7 connecting the communication carrier 8 and the mobile communication device 20.

The mobile communications device 20 capable of receiving TV broadcasts comprises a mobile communication function portion 21 for mobile communication over a communication network, a mobile communication antenna 22, a display portion 23, a TV broadcast receiving portion 25 for receiving TV broadcast radio wave from a TV broadcast station 12, a TV broadcast receiving antenna 26, and an internal recording device 27. A mobile communication function portion 21 may possess for example a W-CDMA type mobile communication function. The TV broadcast receiving portion 25 may for example, possess a function to receive ground wave digital television broadcasts. However, the TV broadcast receiving portion 25 may also possess functions to receive ground wave analog television broadcasts, BS (Broadcast Satellite) broadcasts, CS (Communication Satellite) broadcasts, etc.

The program recording device 30 contains a recording server 31, a TV broadcast receiver 35, a TV broadcast receiving antenna 36, and a recording device 37. A detailed description of a typical structure of the mobile communications device 20 capable of receiving TV broadcasts and the recording server 31 are described later on. The communication control device 40 is described in detail while referring to FIG. 9 through FIG. 11.

A method for recording (video recording) broadcast programs by using the recording system of this embodiment for recording TV broadcast programs is described next. A program may be used to implement this method and a recording medium may hold the program. An incoming call from another communication party 10 occurs when the user is viewing a TV broadcast program by means of the mobile communications device 20 that is capable of receiving TV broadcasts. Instead of the incoming call, the mobile communications device 20 might make an outgoing call to the other communication party 10.

In this embodiment, the mobile communications device 20 records the TV program the user is viewing when an outgoing call to the other communication party 10 from the mobile communications device 20, or an incoming call from the other communication party 10 is detected. The mobile communications device 20 may also start recording of the TV broadcast program when the start of the call is detected, rather than when an incoming or outgoing call is detected. However, such a case that the recording of a TV broadcast program starts when an incoming or outgoing call is detected is described next.

An automatic recording mode or a manual recording mode may also be installed. In automatic recording mode, recording of the TV broadcast starts automatically when an incoming or outgoing call is detected. In manual recording mode, a query is made to the user asking whether to record the broadcast program or not when an incoming or outgoing call is detected. Recording of the TV broadcast program then starts, when the user commands recording. In this case, the display portion 23 indicates whether automatic mode is set or manual mode is set. However, the following description explains automatic recording of the TV broadcast program when an incoming or outgoing call is detected.

Recording of the TV broadcast program ends when the call with the other communication party 10 is completed. By playing back the recorded TV broadcast program, the user can view or hear the portion of the program that is missed during the call.

The destination where the program will be recorded is the internal recording device 27 of mobile communication device 20 or the recording device 37 of program recording device 30. When recording a program in internal recording device 27 of mobile communication device 20, a recording command is outputted to the internal recording device 27 by mobile communication device 20 when an incoming or outgoing call is detected. The mobile communication device 20 outputs a recording stop command to the internal recording device 27 when the end of the communication is detected.

When recording in the recording device 37 of program recording device 30, the mobile communication device 20 sends a recording command to the recording server 31. The recording command from the mobile communication device 20 is sent to the recording server 31 from mobile communication antenna 22 over the communication network. The communication network contains a public wireless line 7, a communication carrier 8, a gateway 6 and the Internet 5 as shown in the figure. The TV broadcast receiver 35 installed in the recording server 31, receives the TV broadcast radio waves via the TV broadcast receiving antenna 36, and records the TV broadcast program in the recording device 37. The recording stop command from the mobile communication device 20 is sent to the recording server 31 in the same way.

Also in this embodiment, when the mobile communication device 20 detects radio wave difficulties while the user viewing the TV broadcast program, it sends a recording command to the recording server 31. The recording server 31 then records that TV broadcast program in the recording device 37. When the radio wave difficulties have ended, the mobile communication device 20 sends a recording stop signal to the recording server 31. By playing back the recorded TV broadcast program recorded in the server 31, the user can view the portion of the program that is missed due to the radio wave difficulties.

One mobile communication device 20 is shown in FIG. 1, however a plurality of mobile communication devices may actually be used. The recording server 31 receives the recording commands from a plurality of mobile communication devices 20. When a plurality of recording commands are sent simultaneously, the recording server 31 simultaneously records a plurality of broadcast programs. The TV broadcast receiver 35 can simultaneously receive a plurality of broadcast program channels.

The example shown in FIG. 1 uses the internal recording device 27 of mobile communication device 20 or the recording device 37 of program recording device 30 as a program recording destination. However, other recording destinations may also be utilized. The close range wireless communication typified by Blue Tooth for example may be utilized and other portable recording devices not shown in the drawing used as a program recording destination. In that case, the same as internal recording device 27, these recording destinations cannot be used during radio wave difficulties.

In the example in FIG. 1 a recording the TV broadcast program is described. However, the same method can be utilized to record all programs and information broadcast by the TV broadcast station 12 for example, digital text broadcasts, digital music broadcasts, and program information, etc.

When the mobile communication device uses the W-CDMA system, incoming and outgoing call of mobile communications can be made simultaneously with Internet connections. However, when incoming and outgoing calls cannot be made simultaneously with the use of Internet using mobile communication terminal such as a cellular telephone, then dual antenna may be installed. Recording commands can in this way be sent over the Internet to the recording server 31.

Figure 2:
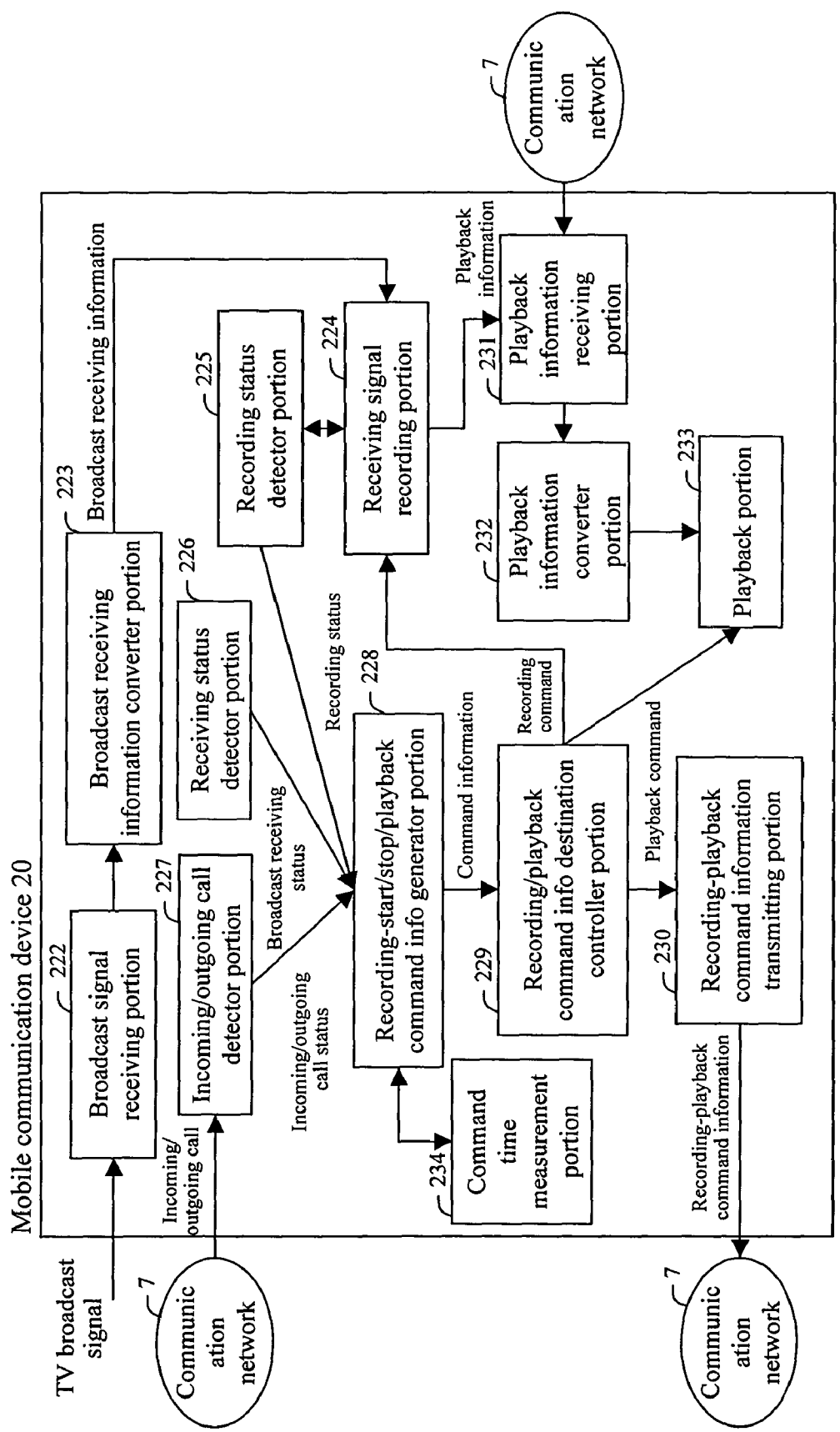
FIG. 2 is a block diagram showing a typical structure of the mobile communication device of the present invention.

The structure of the mobile communication device 20 capable of receiving TV broadcasts in the present invention is described next while referring to FIG. 2. The mobile communication device 20 of this embodiment, comprises a broadcast signal receiving portion 222 for receiving the TV broadcast signal, a broadcast receiving information converter portion 223 for converting the broadcast signal to broadcast receiving information, a receiving signal recording portion 224 for recording the broadcast receiving information, a recording status detector portion 225 for monitoring the recording status, a receiving status detector portion 226 for detecting the receiving status of the broadcast signal, an incoming/outgoing call detector portion 227 for detecting incoming/outgoing and termination of calls, a recording-start recording-stop playback command information generator portion 228 for generating recording-start/recording-stop/playback command information, a recording/playback command information destination controller portion 229 for controlling the recording/playback command information transmitting destination, a recording/playback command information transmitting portion 230 for sending recording/playback command information over a communication network, a playback information receiving portion 231 for receiving playback information from the receiving signal recording portion 224 or over the communication network, a playback information converter portion 232 for converting the playback information to image information, a playback portion 233 for playing back the image information, and a command time measurement portion 234 for measuring the command time used to control recording/playback.

The broadcast signal receiving portion 222 receives the TV broadcast signal via the broadcast receiving antenna 26. This signal is converted to a video signal or in other words, broadcast receiving information by the broadcast receiving information converter portion 223. This broadcast receiving information is recorded in the receiving signal recording portion 224 and played back by the playback portion 233 utilizing the following described method.

The recording status detector portion 225 monitors the recording status of the receiving signal recording portion 224 and notifies the recording-start recording-stop playback command information generator portion 228 if recording is possible or not. The receiving status detector portion 226 detects the receiving status of the TV broadcast signal and notifies the recording-start/recording-stop/playback command information generator portion 228 (hereafter recording-start/stop/playback info generator portion 228) of the TV broadcast receiving status. The incoming/outgoing call detector portion 227 detects incoming/outgoing calls and termination of calls and notifies recording-start/stop/playback info generator portion 228 of the communication status.

The recording-start/stop/playback info generator portion 228 makes recording start command information, recording stop command information or playback command information from the recording status, broadcast receiving status, and communication status. The recording-start/stop/playback info generator portion 228 reports this information to the recording/playback command information transmitting destination controller portion 229. The recording/playback command information transmitting destination controller portion 229 notifies the recording/playback command to the recording destination set by the user.

When the recording destination is the internal recording device 27, the recording/playback command information transmitting destination controller portion 229 notifies the receiving signal recording portion 224 of the recording command. The recording/playback command information transmitting destination controller portion 229 also notifies the playback portion 233 of the playback command. When the recording destination is the recording server 31, the recording/playback command information transmitting destination controller portion 229 (hereafter, recording/playback destination controller portion 229) sends the recording/playback information transmitting portion 230 of this recording/playback command information. The recording/playback information transmitting portion 230 sends the recording/playback command information to the external recording server 31 over the communication network.

The playback information receiving portion 231 receives the playback information from the communication network or the receiving signal recording portion 224 and sends this information to the playback information converter portion 232. The playback information converter portion 232 converts the playback information into video information and sends it to the playback portion 233. The playback portion 233 playbacks the video information based on the playback command from the recording/playback destination controller portion 229.

An example of control method of the present invention for the mobile communication device capable of receiving TV broadcasts is described next while referring to FIG. 3 and FIG. 4.

Figure 3:
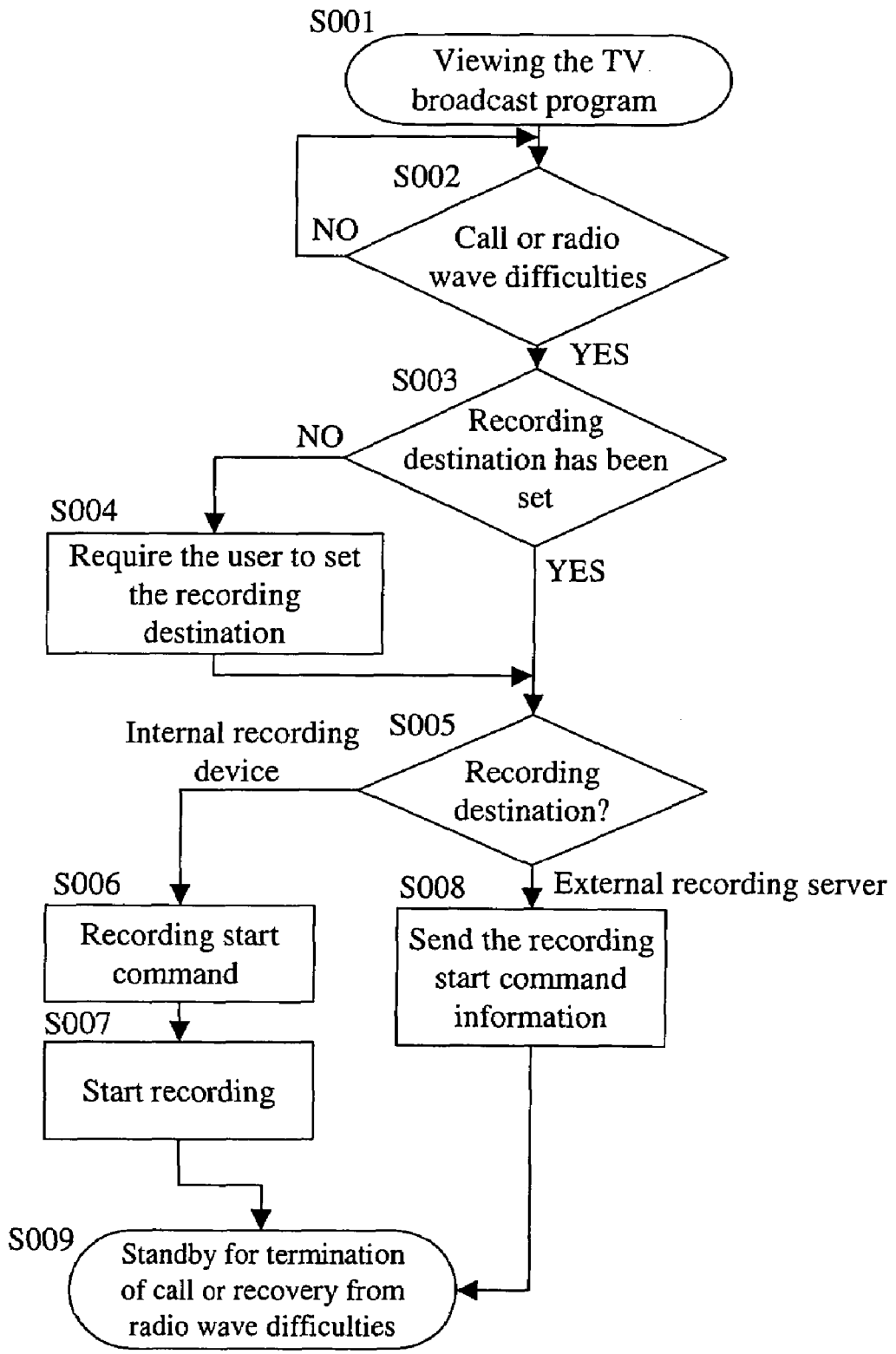
FIG. 3 is a flow chart for describing the recording method used in the mobile communication device of the present invention.

First of all, in step S001 of FIG. 3, the user is viewing or hearing the TV broadcast program on the mobile communication device capable of receiving TV broadcasts. In step S002, a judgment is made whether an incoming or outgoing call of mobile communication is made or whether viewing of the TV broadcast has become impossible. Viewing the TV broadcast program becomes impossible, when the TV broadcast radio waves can not be received due to for example radio wave difficulties. When an incoming or outgoing call is made or viewing has become impossible, then a judgment is made in step S003 whether a recording destination for the TV broadcast program has been set or not. If a recording destination has been set then the process proceeds to step S005.

When no recording destination has been set, then the user is asked to set the recording destination in Step S004. However, when radio wave difficulties have occurred, then the internal recording device 27 of mobile communication device 20 cannot be set as a recording destination. When the user sets the recording destination, the process proceeds to step S005.

In step S005, a judgment is made whether the recording destination set by the user is the internal recording device 27 of mobile communication device 20 or recording device 37 of program recording device 30. When the recording destination is internal recording device 27 of mobile communication device 20, the process proceeds to step S006 and recording-start command information is sent to the internal recording device 27. The internal recording device 27 of mobile communication device 20 starts recording the TV broadcast program being viewed in step S007. In step S009, the process awaits termination of call or recovery from radio wave difficulties.

When the recording destination is the external recording server 31, the recording/playback information transmitting portion 230 of mobile communication device 20 sends the recording start/playback command information to the external recording server 31 in step S008. The recording server 31 records the TV broadcast program viewed by the user into the recording device 37. Then in step S009, the process awaits termination of call or recovery from radio wave difficulties.

Figure 4:
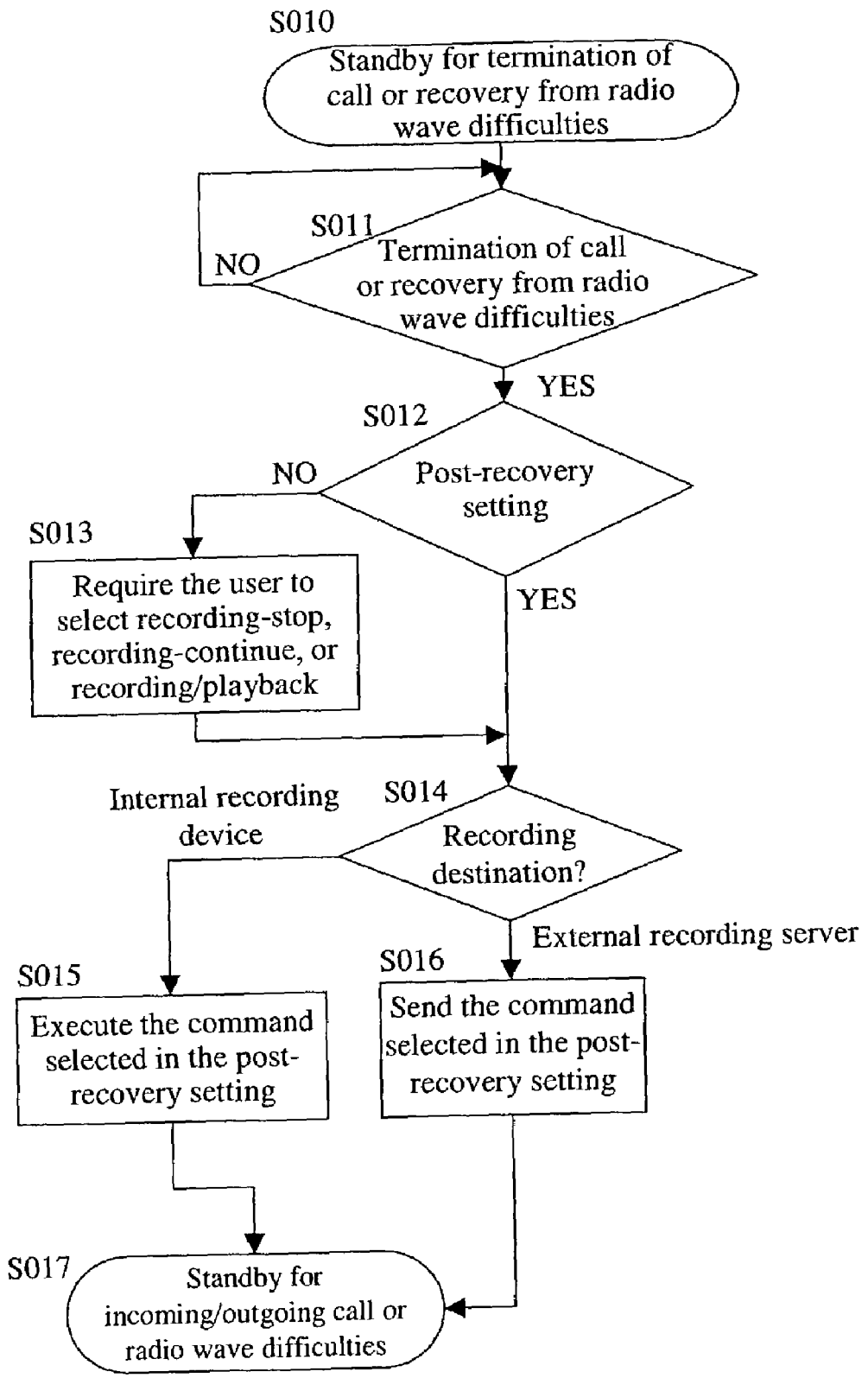
FIG. 4 is a flow chart for describing the recording method used in the mobile communication device of the present invention.

Next, in step S010 of FIG. 4, the process awaits termination of call or recovery from radio wave difficulties. In step S011, a judgment is made whether the call is terminated or radio wave difficulties are recovered. When decided that call is terminated or radio wave difficulties are recovered then a judgment in made in step S012 whether the "post-recovery setting" is made. This "post-recovery setting" is a setting which is made in advance to execute for example, recording-stop, recording-continue, or recording/playback after termination of call or recovery from radio wave difficulties.

When the "post-recovery setting" has been made, the process proceeds to step S014. However, if the "post-recovery setting" has not been made, then in step S013, the user is requested to make the post-recovery setting. When the user makes the post-recovery setting, the process proceeds to step S014.

In step S014, a judgment is made if the recording destination is the internal recording device 27 of mobile communication device 20 or the recording device 37 of program recording device 30. When the recording destination is internal recording device 27 of mobile communication device 20, then the selected command set in a post-recovery setting is executed in step S015. For example, the recording/playback destination controller portion 229 commands the receiving signal recording portion 224 to stop recording, or the playback portion 233 to play back the program stored in the internal recording device 27. When the recording destination is recording device 37 of program recording device 30, then in step S016, the recording/playback information transmitting portion 230 sends the command selected in the post-recovery setting to the recording server 31. There, for example, playback of the program recorded in the recording device 37 of the external program recording device 30 is executed. Afterwards, in step S017, the process shifts to standby for an outgoing or incoming call or radio wave difficulties.

In the method of this embodiment, recording of the TV broadcast program starts automatically, when there is an incoming or outgoing call of mobile communication, or the broadcast program cannot be viewed due to radio wave difficulties. The recording is stopped and playback of the recorded broadcast program starts when the call of mobile communication is terminated or radio wave difficulties are recovered. The portion of the TV broadcast program that is missed due to a call or radio wave difficulties can therefore be viewed later. The processing to start recording, stop recording, continue recording and playback may be executed automatically.

Figure 5:
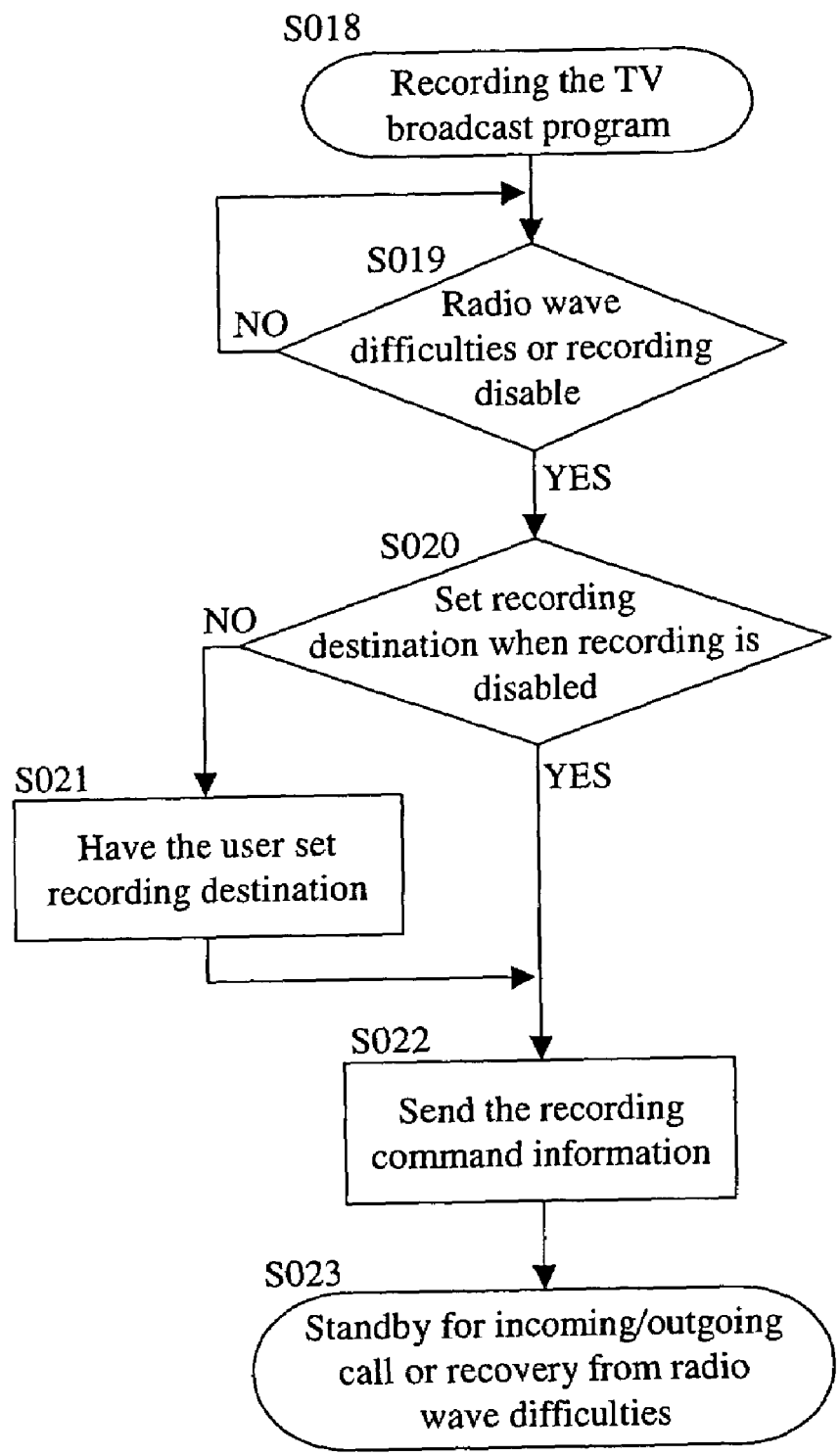
FIG. 5 is a flow chart for describing the recording method used in the mobile communication device of the present invention.

The method in this embodiment for continuing the recording using the mobile communication device 20 (capable of TV broadcast reception) is described next while referring to FIG. 5. First of all, in step S018, the TV broadcast program is recorded in the internal recording device 27 of mobile communication device 20 capable of receiving TV broadcasts. In step S019, during recording of the TV broadcast program, a judgment is made if the recording status detector portion 225 of mobile communication device 20 detected that recording is impossible or the receiving status detector portion 226 detected radio wave difficulties. The recording status detector portion 225 detects that recording is impossible, when the recording space on the internal recording device 27 become smaller than a specified amount or the internal recording device 27 is used by another device, etc. When the recording status detector portion 225 detects that recording is impossible, or the receiving status detector portion 226 detects radio wave difficulties, then the process proceeds to step S020.

In step S020, a judgment is made whether or not a second recording destination has been set for continuing the recording. When a second recording destination has been set, then the process proceeds to step S022. However, when a second recording destination has not been set, then a request is made to the user in step S021 to make the second recording destination setting. The process then proceeds to step S022 when the user sets the second recording destination.

In step S022, the recording-start/stop/playback info generator portion 228 sends the recording-start command information to the second recording destination, for example, the external recording server 31. In this way, recording can continue on the recording device 37 of program recording device 30. Afterwards in step S023, the process shifts to standby to await incoming calls, outgoing calls, or radio wave difficulties.

Figure 6:
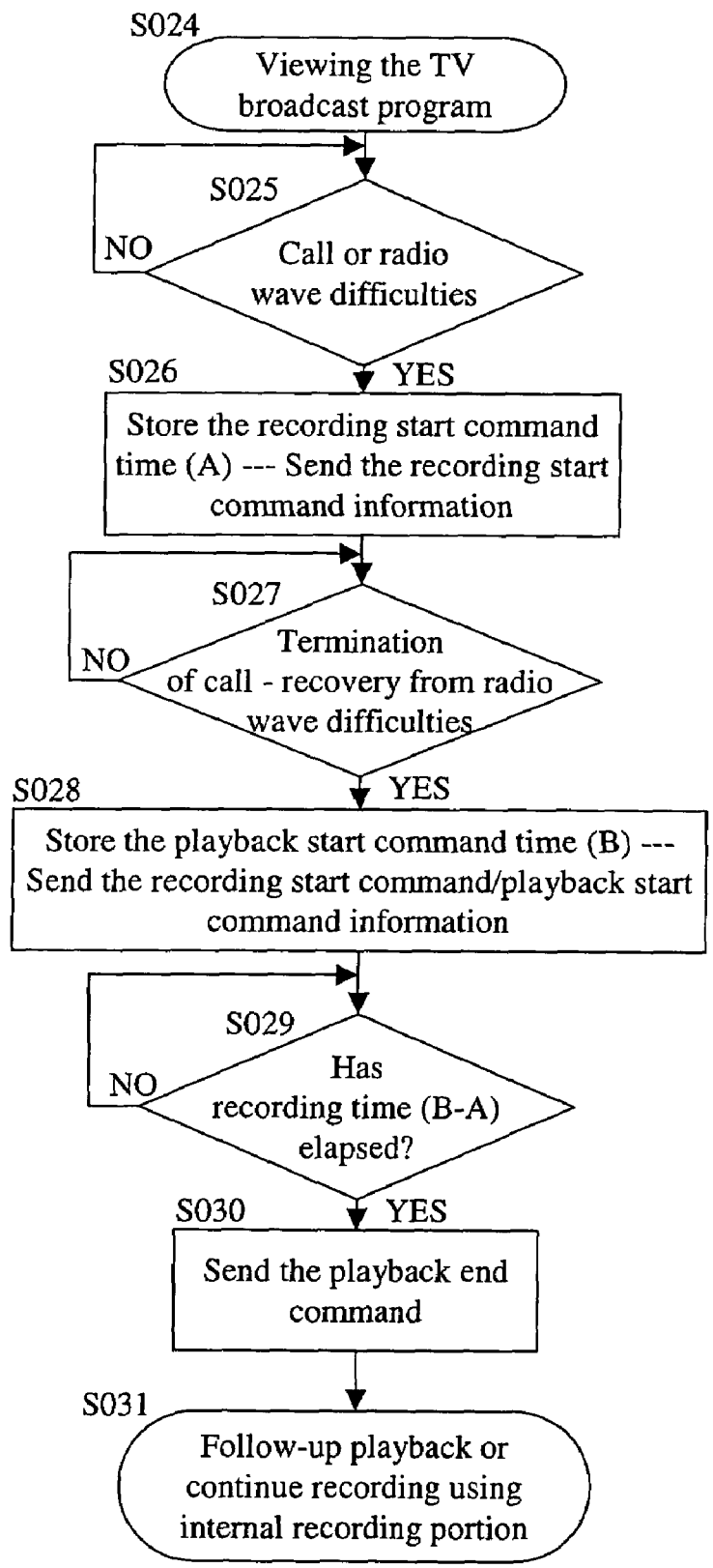
FIG. 6 is a flow chart for describing the recording method used in the mobile communication device of the present invention.

An example of the recording/playback command method by using mobile communication device 20 capable of TV broadcast reception is described next while referring to FIG. 6. In this example, the TV broadcast program is recorded in the external server 31. First of all, in step S024, the mobile communication device capable of TV broadcast reception receives the TV broadcast signal and the user views the TV broadcast program. In step S025, a judgment is made whether an incoming or outgoing call of mobile communication is made or whether viewing the TV broadcast is impossible due to radio wave difficulties. When an incoming or outgoing call of mobile communication has occurred, or when viewing of the TV broadcast program is impossible, then in step S026, the recording-start/stop/playback info generator portion 228 stores the recording-start-command-time A by using the command time measurement portion 234 and sends the recording start command information to the external server 31.

In step S027, a judgment is made that the call is terminated or that radio wave difficulties are recovered. When a call is terminated or radio wave difficulties are recovered, then in step S028, then the recording-start/stop/playback info generator portion 228 stores the playback-start-command-time B by using the command time measurement portion 234 and sends the playback start command information to the external server 31.

In step S029, a judgment is made whether or not all data recorded in the recording device 37 of program recording device 30 has been played back or not. The differential B-A between the playback-start-command-time B stored in the command time measurement portion 234 and the recording start command time A, is the recording time. By determining if a recording time of B-A has elapsed, the recording-start/stop/playback info generator portion 228 can determine whether or not all data recorded in the recording device 37 has been played back or not.

In step S030, when the recording-start/stop/playback info generator portion 228 detects that recording time B-A has elapsed, it sends playback end command information to the external recording server 31. The external recording server 31 then stops playback process. In step S031, follow up playback and continued recording are performed using the internal recording device 27 of mobile communication device 20.

The recording of the TV broadcast program of this embodiment continues in this way, using the external recording server from the occurrence of an incoming or outgoing call or radio wave difficulties, up to termination of a call or recovery from radio wave difficulties. Further, when a call is terminated or radio wave difficulties are recovered, the portion recorded in the external recording server 31 is automatically played back and at the same time the TV broadcast program is recorded in internal recording device 27 of mobile communication device 20. The TV broadcast program recorded in internal recording device 27 may also be played back when playback of the external recording server 31 has ended.

Figure 7:
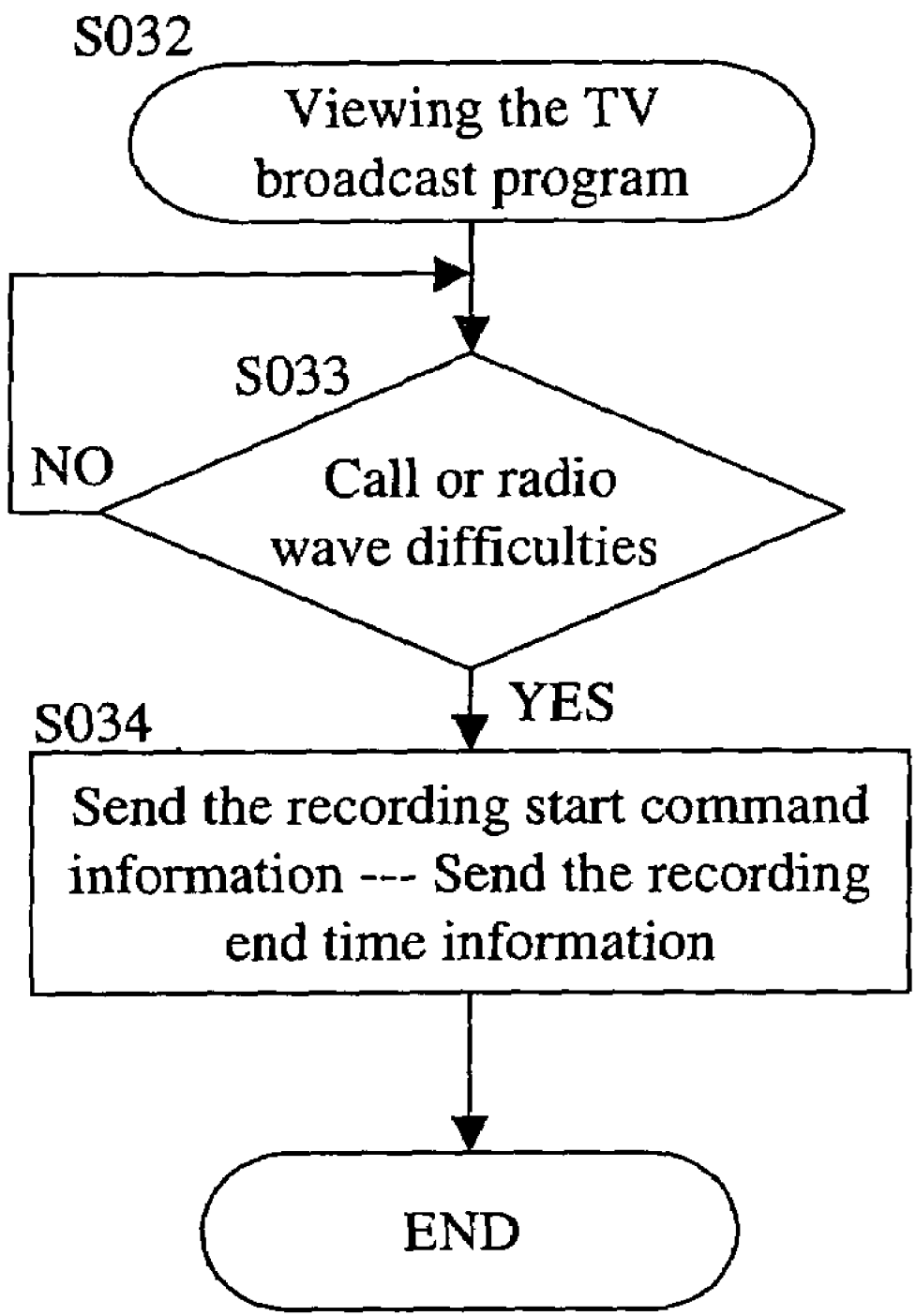
FIG. 7 is a flow chart for describing the recording method used in the mobile communication device of the present invention.

An example of the recording/playback command method by using the mobile communication device capable of receiving TV broadcasts in the present invention is described next while referring to FIG. 7. In this example, the TV broadcast program is recorded in the external recording server 31. First of all, in step S032, the mobile communication device capable of receiving TV broadcasts of this embodiment receives the TV broadcast signal and the user views the TV broadcast program. In step S033, a judgment is made whether an outgoing or incoming call of mobile communication is made or not, or whether viewing of the TV broadcast program is impossible due to radio wave difficulties. When there is an outgoing or incoming call of mobile communication or viewing of the TV broadcast program is impossible, the process shifts to S034 and the recording-start/stop/playback info generator portion 228 sends the recording start command information to the recording server 31 and simultaneously sends the recording end time information. This recording end time information may be set previously by the user, or may be generated by detecting the end time of a TV broadcast program currently being viewed over the communication network. In this example, the recording time is specified and a recording command is sent to the external recording server 31 when there is an outgoing or incoming call or radio wave difficulties.

Figure 8:
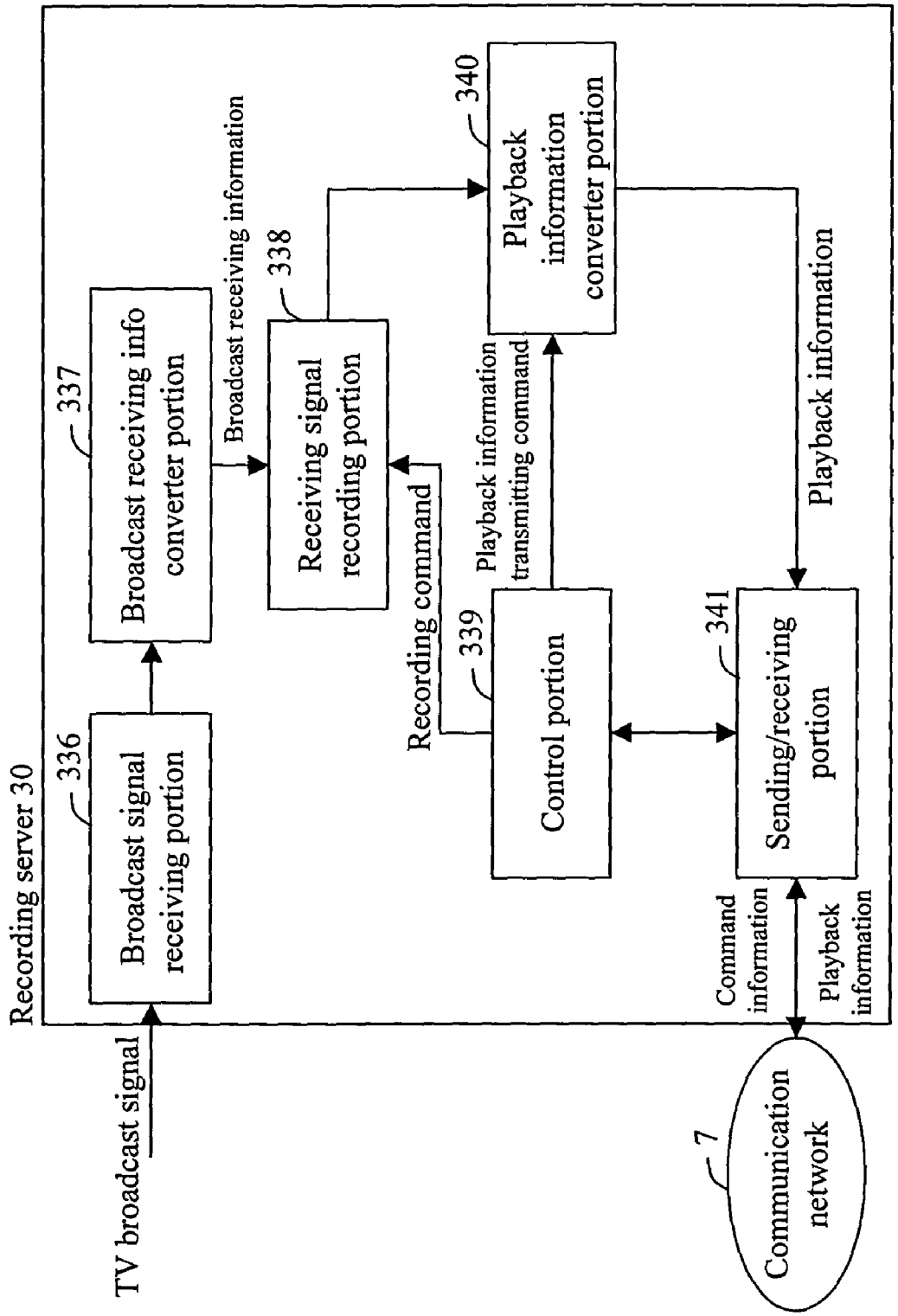
FIG. 8 is a block diagram showing a typical structure of the recording server of the present invention.

The structure of the recording server 31 of the present invention is described next while referring to FIG. 8. The recording server 31 of this example may be a home server or a portable recording device connected by Blue Tooth, etc. However, the portable recording device cannot be used during radio wave difficulties.

The recording server 31 comprises a broadcast signal receiving portion 336 for receiving the TV broadcast signal, a broadcast receiving info converter portion 337 for converting the TV broadcast signal to broadcast receiving information, a receiving signal recording portion 338 for recording the broadcast receiving information, a control portion 339 for sending recording commands to the receiving signal recording portion 338 and/or playback information transmitting commands to the playback information converter portion 340, and a playback information converter portion 340 for sending playback information to the sending/receiving portion 341 when there is a playback information transmitting command from the control portion 339.

The broadcast signal receiving portion 336 receives the TV broadcast signal via the TV broadcast receiving antenna 36. The broadcast receiving info converter portion 337 converts the TV broadcast signal into a video signal or in other words, the broadcast receiving information. As described next, the receiving signal recording portion 338 records the broadcast receiving information and the playback information converter portion 340 plays back this information.

When the recording commands or the playback commands are received over a communication network, the sending/receiving portion 341 sends them to the control portion 339. The control portion 339 sends the recording command to the receiving signal recording portion 338, and the playback information transmitting commands to the playback information converter portion 340. The receiving signal recording portion 338 records the broadcast receiving information based on recording commands from the control portion 339. The playback information converter portion 340 converts the information recorded in the receiving signal recording portion 338 into playback information based on the playback information transmitting command from the control portion 339, and sends this playback information to the sending/receiving portion 341. The sending/receiving portion 341 sends the playback information over the communication network to the mobile communication device 20.

Receiving the recording command or the playback command from the mobile communication device 20, the recording server 31 of this example starts recording the TV broadcast signal and/or sends the playback information to the mobile communication device 20 via the communication network. The recording server 31 therefore performs recording or playback by remote commands from the mobile communication device 20.

Once again referring to FIG. 1, the communication control device 40 controls communication between the mobile communication device 20 and the other communication party 10, etc via the public wireless line 7. Further, the communication control device 40 commands the program recording device 30 the recording or the distribution of portions of the program that could not be viewed or recorded during the call by the mobile communication device 20. In this example, the communication control device 40 also relays the viewing data of the TV broadcast program recorded in the program recording device 30 to the mobile communication device 20 based on the distribution command from the mobile communication device 20 via the public wireless line 7.

Figure 9:
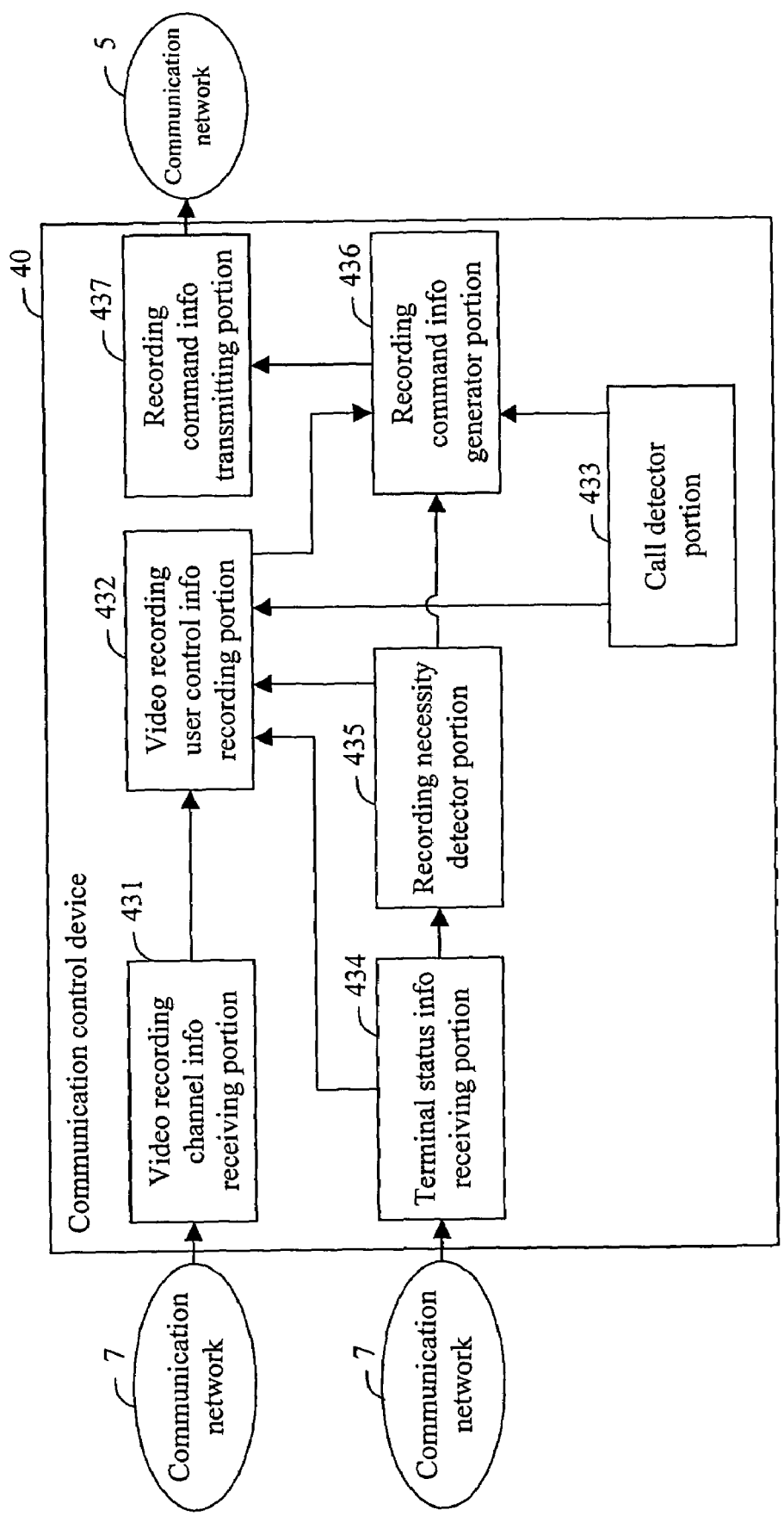
FIG. 9 is a block diagram showing a first embodiment of the communication control device of the present invention.

The structure of the first embodiment of the communication control device of the present invention is described next while referring to FIG. 9 and to FIG. 1 when necessary. In order to simplify the description for FIG. 9, the structure of the relay/control functions for communication of calls and information data between the communication control device 40 and other communication parties 10 is not essentially changed from the known art and is omitted from the drawings.

The communication control device 40 of this embodiment comprises a video recording channel info receiving portion 431 for receiving video recording channel information from the mobile communication device 20 and connected by mobile communication radio waves over a public wireless line 7 (in other words, a communication network) to the mobile communication device 20, a video recording user control info recording portion 432 for recording user control information for each user or in other words each mobile communication device 20, a call detector portion 433 for detecting incoming calls, outgoing calls and termination of calls, a terminal status info receiving portion 434 for receiving terminal status information from the mobile communication device 20 by mobile communication radio waves over the public wireless line 7, a recording necessity detector portion 435 for detecting the recording necessity of a TV broadcast program from the terminal status information received from the terminal status info receiving portion 434, a recording command info generator portion 436 for generating recording stop command information to make recording stop commands for TV broadcast programs, as well as recording command information to make TV broadcast program recording commands to the recording server 31 of program recording device 30, and a recording command info transmitting portion 437 for sending recording command information or recording stop command information to the recording server 31 over the Internet (in other words, communication network) 5.

The video recording channel info receiving portion 431 receives as video recording information, the TV broadcast program channel information that is currently being recorded in the internal recording device 27 or the TV broadcast program currently being viewed on mobile communication device 20. The video recording channel info receiving portion 431 outputs that information to the video recording user control info recording portion 432.

The video recording (video recording) channel info receiving portion 431 periodically receives as video recording channel information, the channel information of the TV broadcast program currently being received by the mobile communication device 20.

When the broadcast program is being displayed on the display portion 23 or is being recorded in the internal recording device 27, the mobile communication function portion 21 of mobile communication device 20 acquires the channel information from the TV broadcast receiving portion 25. The mobile communication function portion 21 appends identification information of the user or the mobile communication device 20 to the channel information, and sends it at pre-set periods as video recording information to the communication control device 40.

In the above example the sending of the video recording channel information from mobile communication device 20 and the receiving of the video recording channel information by the communication control device 40 is performed at preset periods. However other methods are also possible.

For example, whenever a channel being viewed is changed, the channel information after the change may be sent as updated channel information; from the mobile communication function portion 21 of mobile communication device 20 to the video recording channel info receiving portion 431 of communication control device 40. The mobile communication device 20 may send the channel information that is preset by the user, as video recording channel information.

The call detector portion 433 detects an outgoing call from the mobile communication device 20 to another communication party 10, an incoming call from another communication party 10 to the mobile communication device 20, as well as starting or terminating of call based on the incoming or outgoing call. The call detector portion 433 attaches identification information of the user or mobile communication device 20 to these detected results. The call detector portion 433 reports this information to the video recording user control info recording portion 432 and the recording command info generator portion 436.

The terminal status info receiving portion 434 receives the terminal status information relating to the mobile communication device 20 sent from the mobile communication device 20, and outputs that information to the video recording user control info recording portion 432 and the recording necessity detector portion 435. The terminal status information for the mobile communication device 20 contains detection information on starting or ending of user viewing or recording of the TV broadcast program, detection information on radio wave difficulties received in the TV broadcast radio waves during the recording or viewing of the TV broadcast program; detection information that the remaining battery capacity has fallen below a fixed level, or detection information that the recording capacity of the internal recording device 27 for recording the TV program broadcast has reached a certain level, etc.

In this example, the terminal status info receiving portion 434 periodically receives the terminal status information from the mobile communication device 20 as periods set beforehand, the same as the case that the video recording channel information is received by the video recording channel info receiving portion 431.

The mobile communication device 20 detects the terminal status of its own device, attaches to it the user or mobile communication device 20 identification information, and sends it in preset periods to the control communication device 40.

Whenever the terminal status information is received from the mobile communication device 20, the terminal status info receiving portion 434 compares this currently received terminal status information with the terminal status information received the previous time, and detects a change in that terminal status. When a change in the terminal status has occurred, it adds the identification information of the user or mobile communication device 20 to this currently received terminal status information and outputs it to the video recording user control info recording portion 432 and the recording necessity detector portion 435. Simultaneously, the recorded terminal status information that is received at the previous time is updated using the currently received terminal status information.

In the above example, the terminal status information is sent by this mobile communication device 20 periodically at preset periods, and is received by the communication control device 40 periodically at preset periods, however, other methods may be utilized.

For example, every time the terminal status changes, the mobile communication function portion 11 of mobile communication device 20 may send the changed terminal status as updated information. The mobile communication device 20 may send a terminal status preset by the user as a terminal status information. In this case, there is no need for the terminal status info receiving portion 434 to record and store the terminal status information that is received at the previous time.

The recording necessity detector portion 435 generates a recording necessity command or a recording necessity cancel command based on terminal status information reported from the terminal status info receiving portion 434. These commands are reported to the video recording user control info recording portion 432 and recording command info generator portion 436. As described previously, this recording necessity command is generated: when radio wave difficulties occur while receiving radio waves are being received by the TV broadcast receiving antenna 13; when the remaining battery capacity of the mobile communication device 20 falls below a fixed level; or when the remaining recording capacity of the internal recording device 27 used for recording a TV broadcast program has reached a fixed amount.

The recording necessity cancel command is generated: when radio wave difficulties in broadcast radio waves by the TV broadcast receiving antenna 15 is recovered; when the remaining battery level of the battery used as a power supply for the mobile communication device 20 has been restored by charging; or when the recording capacity of the internal recording device 27 used for recording a TV broadcast program has been restored to a recording capable level by data arrangement, etc.

The video recording user control info recording portion 432 records the video recording channel information from the video recording channel info receiving portion 431 as user management information. As described previously, the video recording channel information contains channel information for the TV broadcast program and also identification information on the user or mobile communication device 20.

The video recording user control info recording portion 432 starts recording the video-recording channel information simultaneous with the starting or viewing of the TV broadcast program. The video recording user control info recording portion 432 also stops recording the video-recording channel information simultaneous with the end of recording or viewing of the TV broadcast program. Only the video-recording channel information of the TV broadcast program received by the mobile communication device 20 is recorded as user control information in the video recording user control info recording portion 432.

When the video recording user control info recording portion 432 receives a recording necessity command or a recording necessity cancel command from the recording necessity detector portion 435; or receives the detection of an incoming or outgoing call, or termination of call from the call detector portion 433, it searches the video-recording channel information from the user control information based on the terminal status information reported from the terminal status info receiving portion 434. Besides outputting the retrieved channel information to the recording command info generator portion 436 and the recording command info transmitting portion 437, the video recording user control info recording portion 432 simultaneously arranges the user control information.

The video recording user control info recording portion 432 does not record the video-recording channel information unless the user is viewing or recording a TV broadcast program. In this case, instead of video-recording channel information, the video recording user control info recording portion 432 outputs TV program broadcast non-viewing information to the recording command info generator portion 436 and recording command info transmitting portion 437.

When the recording command info generator portion 436 receives a recording necessity command from the recording necessity detector portion 435, or detection of an outgoing or incoming call from the call detector portion 433, it generates recording command information based on the video-recording channel information from the video recording user control info recording portion 432, and outputs that recording command information to the recording command info transmitting portion 437.

The recording command info generator portion 436 does not generate recording command information if it receives TV program broadcast non-viewing information from the video recording user control info recording portion 432, even when the recording command info generator portion 436 receives recording necessity command from the recording necessity detector portion 435, or receives detection of an outgoing or incoming call from the call detector portion 433.

When the recording command info generator portion 436 receives a recording necessity cancel command from the recording necessity detector portion 435, or detection of termination of call from the call detector portion 433, it generates recording stop command information based on the video-recording channel information from the video recording user control info recording portion 432 and outputs that information to the recording command info transmitting portion 437.

The recording command info generator portion 436 does not generate recording command stop information when TV program broadcast non-viewing information is received from the video recording user control info recording portion 432, even when a recording necessity cancel command is received from the recording necessity detector portion 435, or termination of call is detected from the call detector portion 433.

The recording command info transmitting portion 437 sends recording command information or recording stop command information from the recording command info generator portion 436 to the recording server 31 of program recording device 30 via the gateway 6 over Internet 5.

When the recording server 31 of program recording device 30 receives the recording command information from communication control device 40, it confirms whether or not viewing data is being acquired for the TV broadcast program information whose recording is requested.

When confirmation results show the viewing data for the TV broadcast program information is not being acquired, the recording server 31 acquires the viewing data from the TV broadcast receiver 35 and records it in the recording device 37. The recording server 31 simultaneously records the start point of the viewing data.

When confirmation results show the viewing data for the TV broadcast program information is already being acquired, the recording server 31 records the starting point of the viewing data.

When the recording server 31 has received recording stop command information from the communication control device 40, it records the end point of the viewing data and generates the recording range of the viewing data by utilizing this end point.

The recording server 31 determines whether or not there are a recording command for this same TV broadcast program from other mobile communication devices. When there are no recording commands from other mobile communication devices, the recording server 31 stops the recording of viewing data onto the recording device 37, when the generating of viewing data recording range for the applicable mobile communication device 20 has ended.

Next, the method for recording a TV broadcast program that the user could not view or record by utilizing the recording system of the embodiment of the invention is described.

The following explanation describes an example of case that when the user is viewing or recording the TV broadcast program, an outgoing call from the communication party 10 to the mobile communication device 20 or an outgoing call to the communication party 10 from the mobile communication device 20 is made.

When the user is viewing or recording a TV broadcast program using a mobile communication device 20 capable of receiving TV broadcasts, the mobile communication device 20 periodically sends channel information for the TV broadcast program currently being recorded or viewed to the communication control device 40 via mobile communication radio waves as video-recording channel information.

The video recording channel info receiving portion 431 of communication control device 40 receives as video-recording channel information, the channel information of the TV broadcast program currently being viewed or recorded that is periodically sent from the mobile communication device 20. The video recording user control info recording portion 432 adds user or mobile communication device 20 identification information to the channel information and records this as video-recording channel information. The communication control device 40 therefore manages the video-recording channel information of each user or mobile communication device 20 as user control information.

The video-recording channel information for each user or mobile communication device 20 recorded in the video recording user control info recording portion 432 is updated after changing the video-recording channel information. This updating is performed when the user changes the channel of the TV broadcast program currently being viewed or recorded.

When the call detector portion 433 of communication control device 40 detects an outgoing call to a communication party 10 from the user, or an incoming call from another communication party 10, the user or mobile communication device 20 identification information is added to the outgoing or incoming call detection and the call detector portion 433 reports it to the video recording user control info recording portion 432 and recording command info generator portion 436.

The video recording user control info recording portion 432 confirms whether or not the video-recording channel information relating to the user or mobile communication device 20 detected by the call detector portion 433, is recorded as user control information. When the video-recording channel information relating to the user or mobile communication device 20 has been recorded, the video recording user control info recording portion 432 reports this video-recording channel information to the recording command info generator portion 436.

However, when the video-recording channel information relating to the user or mobile communication device 20 has not been recorded, instead of video-recording channel information, the video recording user control info recording portion 432 reports this TV program broadcast non-viewing information to the recording command info generator portion 436.

When notified by the call detector portion 433 that an outgoing or incoming call is detected, the recording command info generator portion 436 generates a recording command based on the video-recording channel information reported from the video recording user control info recording portion 432, and reports this information to the recording command info transmitting portion 437.

This recording information command also contains identification information for the user and mobile communication device 20, etc, besides video-recording channel information.

The recording command info generator portion 436 does not generate a recording command when TV program broadcast non-viewing information from the video recording user control info recording portion 432 is reported, even when detection of an incoming or outgoing call is reported from the call detector portion 433. The recording command info generator portion 436 is used for generating recording commands based on the reported detection of outgoing or incoming calls from other mobile communication reported from other communication devices.

When the recording command info transmitting portion 437 receives a recording command from the recording command info generator portion 436, it sends a recording start command to the recording server 31 of program recording device 30 via the gateway 6 and the Internet 5.

When the recording server 31 receives the recording start command, it starts recording the TV broadcast program onto the recording device 37.

When the call detector portion 433 of communication control device 40 detects termination of a call between the mobile communication device 20 and other communication parties 10, it notifies the termination of call to the video recording user control info recording portion 432 and recording command info generator portion 436.

When the recording command info generator portion 436 receives the detection of termination of call from the call detector portion 433, it generates a recording stop command based on video-recording channel information reported from the video recording user control info recording portion 432. This recording stop command is reported to the recording command info transmitting portion 437.

The recording stop command contains identification information on the user and mobile communication device 20, etc, besides video-recording channel information.

When the recording command info transmitting portion 437 receives a recording stop command, it generates a recording end command and sends it to the recording server 31 of program recording device 30 via the gateway 6 and the Internet 5.

The recording server 31 stops recording the TV broadcast program onto the recording device 37.

When the recording command info generator portion 436 receives the TV broadcast non-viewing information from the video recording user control info recording portion 432, it does not generate that recording stop command, even if it is notified termination of a call on the mobile communication device 20 by the call detector portion 433.

In the present embodiment, even when an incoming call from another communication party 10 or an outgoing call to another communication party 10 occurs during viewing or recording of a TV broadcast program by a user on a mobile communication device 20 capable of receiving TV broadcasts; the TV broadcast program currently being viewed or recorded is automatically recorded on the program recording device 30 by a command from the communication control device 40 without the user having to schedule a special recording operation. Therefore besides not having to miss viewing of a TV broadcast program currently being recorded or viewed, the user can respond to incoming call or make outgoing call without worrying about recording the current TV broadcast program.

In the same way, the operation when changes in the terminal status of the mobile communication device 20 occur is described next. These changes occur when radio wave difficulties occur on the radio waves of the broadcast being received while the user is viewing or recording a TV broadcast program on the mobile communication device 20 capable of receiving TV broadcasts, when the remaining battery capacity of the mobile communication device 20 falls below a fixed level, or when the remaining recording capacity of the internal recording device 27 used for recording a TV broadcast program has reached a fixed amount, etc.

In the above described recording system for TV broadcast programs of this embodiment, the mobile communication device 20 periodically sends terminal status information to the communication control device 40 by utilizing mobile communication radio waves.

The terminal status info receiving portion 434 of communication control device 40 therefore periodically receives the terminal status information sent from the mobile communication device 20, and detects changes in the terminal status information of the user's mobile communication device 20. When the recording necessity detector portion 435 detects that radio wave difficulties occur on the broadcast radio waves being received, that the remaining battery power has fallen below a fixed level, or that the recording storage capacity of the internal recording device 27 has reaches a fixed level, then it reports a recording necessity command to a video recording user control info recording portion 432 and a recording command info generator portion 436.

When the recording command info generator portion 436 receives the recording necessity command from the recording necessity detector portion 435, it generates a recording command based on the video-recording channel information from video recording user control info recording portion 432, the same as when detection of an incoming or outgoing call is reported from the call detector portion 433. The recording command info transmitting portion 437 sends the recording command to the program recording device 30.

Therefore, even when a change in the terminal status of the mobile communication device 20 has occurred during viewing or recording of a TV broadcast program such as when: radio wave difficulties has occurred on the broadcast radio waves being received, or the remaining battery power has fallen below a fixed level; or the recording storage capacity of the internal recording device 27 has reached a fixed level, then the TV broadcast program currently being viewed or recorded is automatically recorded on the program recording device 30 by a command from the communication control device 40 without the user having to schedule a special recording operation. The user therefore avoids having to miss viewing the TV broadcast program currently being recorded or viewed.

A distribution command is sent from the communication control device 40 to the recording server 31 of program recording device 30, when distribution request information attached with user or mobile communication identification information is reported to the communication control device 40 from the mobile communication device 20.

Though not shown in the drawing, the communication control device 40 for example comprises a distribution request info receiving portion for receiving distribution request from the mobile communication device 20, a distribution user control info recording portion for controlling and recording the distribution request, a distribution command info generator portion for generating distribution commands, and a distribution command info transmitting portion for sending distribution commands to the recording server 31 of program recording device 30.

The distribution command info generator portion may automatically generate distribution command information from recording data of video recording user control info recording portion 432 based on call termination detection by the call detector portion 433 of communication control device 40 or a recording necessity end command from the recording necessity detector portion 435. The distribution command info transmitting portion sends the distribution command to the recording server 31 of program recording device 30.

Based on the distribution command info, the recording server 31 of program recording device 30 searches the recording device 37 for TV broadcast program viewing data that the user could not view or record. The recording server 31 sends this retrieved TV broadcast program viewing data to the communication control device 40. This TV broadcast program viewing data is also distributed from the communication control device 40 to the user mobile communication device 20 via the public wireless line 7.

The portion of the TV broadcast program recorded in the program recording device 30 that the user could not view or record is in this way distributed to the user. By playing back this on the mobile communication device 20, the user can avoid missing the portion of the TV broadcast program that could not be viewed or recorded during communication.

Figure 10:
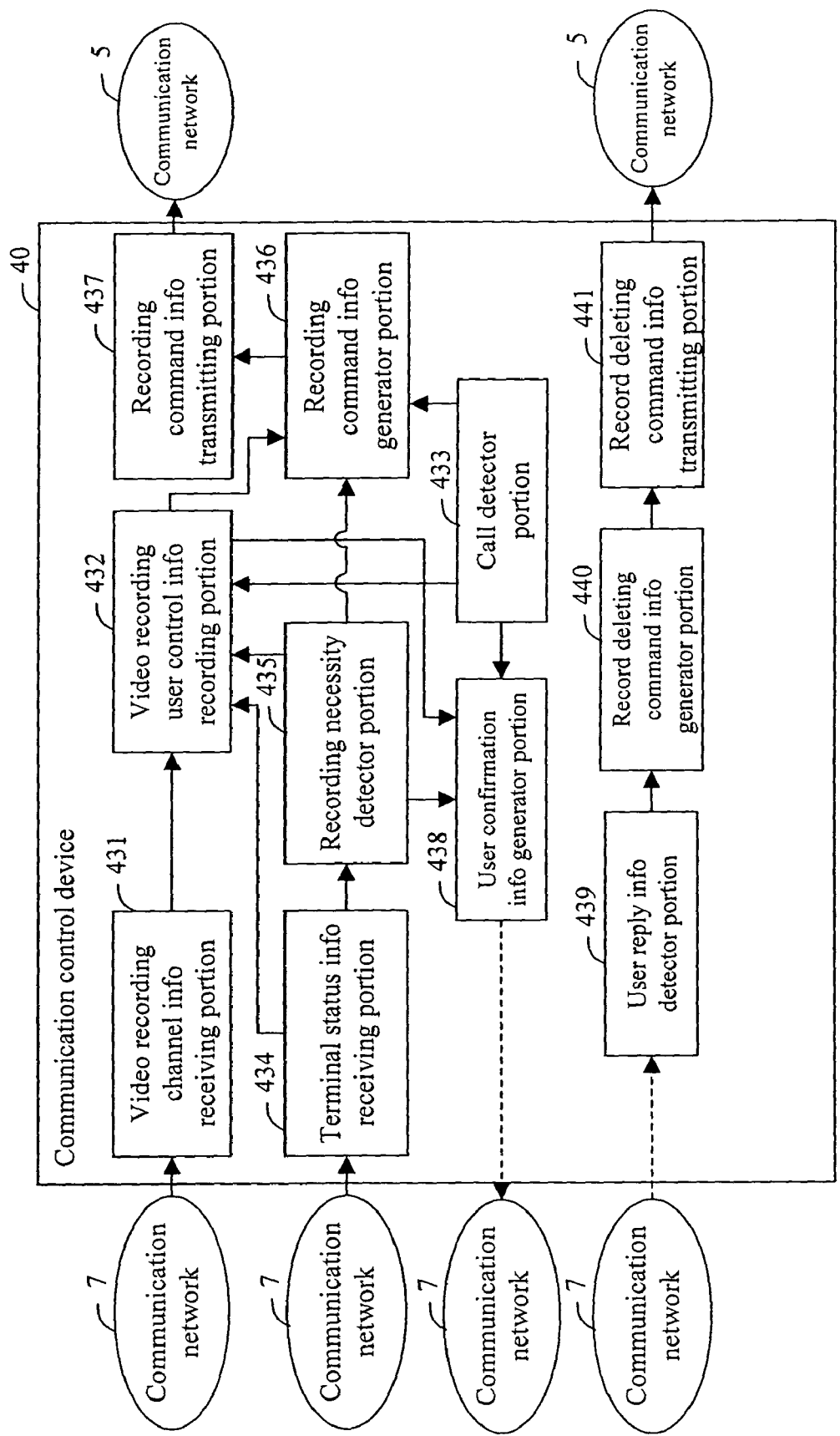
FIG. 10 is a block diagram showing a second embodiment of the communication control device of the present invention.

The structure of the second embodiment of the communication control device of the present invention is described next while referring to FIG. 10. Portions of the structure that are identical to the structure of the first embodiment of the communication control device shown in FIG. 9 are assigned the same reference numerals in FIG. 10 and their detailed description is omitted.

The communication control device 41 of the present embodiment is further comprised of a user confirmation info generator portion 438, a user reply information detector portion 439, a record deleting command info generator portion 440, and a record deleting command info transmitting portion 441.

The user confirmation info generator portion 438 is supplied with video-recording channel information from the video recording user control info recording portion 432, and supplied with notification of a termination of call from the call detector portion 433, and supplied with a recording necessity end command from the recording necessity detector portion 435.

Whenever notified a termination of a call by the call detector portion 433, or supplied with a recording necessity end command from the recording necessity detector portion 435, the user confirmation info generator portion 438 confirms whether or not the TV broadcast program data that the user could not view or record, is recorded in the program recording device 30, based on video-recording channel information supplied from the video recording user control info recording portion 432. When the user confirmation info generator portion 438 confirms that the TV broadcast program data that the user could not view or record is recorded in the program recording device 30, it generates user confirmation information.

This user confirmation information contains; a notification that TV broadcast program data that the user could not view or record is recorded in the program recording device 30, an inquiry as to whether or not distribution of the TV broadcast program recorded in the program recording device 30 is necessary, and an inquiry whether the TV broadcast program recorded in this program recording device 30 is allowed to be deleted or not. The user confirmation information is over the public wireless line 7 to the user mobile communication device 20 from relay/control functions relating communication of calls and information data, not shown in the drawing.

The user reply information detector portion 439 receives user reply information sent from the mobile communication device 20 that is the transmitting destination for the user confirmation information. The user reply information detector portion 439 detects the contents of the user reply information from the received user reply information.

When the contents of the user reply information include a distribution request, the user reply information detector portion 439 manages this request with the video recording user control info recording portion 432 and distributes the TV broadcast program data that the user could not view or record.

When the contents of the user reply information include record deleting approval, the user reply information detector portion 439 reports the record deleting approval to the record deleting command info generator portion 440.

When the record deleting command info generator portion 440 receives the record deleting approval from the user reply information detector portion 439, it generates a record deleting command and supplies that command to the record deleting command info transmitting portion 441.

The record deleting command info transmitting portion 441 sends the record deleting command to the recording server 31 of the program recording device 30 via the gateway 6 and the Internet 5.

When the recording server 31 of the program recording device 30 receives the record deleting command, it confirms whether or not there are record deleting commands from users or mobile communication devices other than this user or mobile communication device 20. When there is no record deleting information from other users or mobile communication devices, the viewing data itself is deleted along with the viewing data range by the applicable user or mobile communication device 20. When there is record deleting information from other users or mobile communication devices, only the viewing data range is deleted by the user or mobile communication device 20.

In the present embodiment, the TV broadcast program that the user could not view or record, is automatically recorded in the program recording device 30 and the recording is deleted after approval to delete the recording is acquired from the user. The present embodiment therefore prevents unnecessary TV broadcast programs from remaining unused in the recording device 37 of program recording device 30 and allows effective use of the recording device 37.

The third embodiment of the communication device of the present invention is described next while referring to FIG. 11. In addition to the relay/control functions for communication of calls and information data with the other communication parties 10, the communication control device 42 of the present embodiment comprises the following structure.

The communication control device 42 comprises a call detector portion 433 for detecting outgoing calls, incoming calls, and termination of calls, and connected to the mobile communication devices 20 over a public wireless line 7 (in other words, a communication network) by mobile communication radio waves, a terminal status info receiving portion 434 for receiving the terminal status information of mobile communication terminal 10, a recording necessity detector portion 435 for detecting the necessity of recording from the terminal status information, a streaming distribution portion 442 for distributing the streaming to the mobile communication device 10 over a communication network, and a distribution end position recording portion 443 for recording the distribution completion position during streaming playback. The detailed structures of the call detector portion 433, the terminal status info receiving portion 434, and the recording necessity detector portion 435 are identical to those of communication control devices 40, 41 of the first and second embodiments so their description is omitted here.

In the communication control device 42 of the present embodiment, the streaming distribution portion 442 performs the streaming distribution to the mobile communication device 20 over the public wireless line 7. When the call detector portion 33 detects an incoming call from another communication party 10 to the mobile communication device 20, or an outgoing call to another communication party 10 from the mobile communication device 20, the call detector portion 33 reports this to the streaming distribution portion 442.

The terminal status info receiving portion 434 receives the terminal status information from the mobile communication device 20 and supplies it to the recording necessity detector portion 435. When a change has occurred in the terminal status information, the recording necessity detector portion 435 generates a recording necessity command and supplies this command to the streaming distribution portion 442. This change in the terminal status information occurs when the remaining battery capacity of the mobile communication device 20 battery has fallen below a fixed level, or the recording capacity of the internal recording device 27 has reached a fixed level.

When the streaming distribution portion 442 receives either detection of an incoming or outgoing call from the call detector portion 433 or a recording necessity command from the recording necessity detector portion 435, the streaming distribution portion 442 stops the streaming and records the distribution end position of the stream in mobile communication device 20 into the distribution end position recording portion 443.

Therefore, when an incoming or outgoing call is made, the distribution of streaming to the mobile communication device 20 from the streaming distribution portion 442 is automatically stopped in cases that an incoming or outgoing call is made, the remaining battery capacity of the mobile communication device 20 has fallen below a fixed level, or the recording capacity of the internal recording device 27 has reached a fixed level.

When the streaming distribution portion 442 receives detection of termination of a call from the call detector portion 432 or a recording necessity end command from the recording necessity detector portion 435, it acquires the distribution end stream position from the distribution end position recording portion 443, and restarts the streaming distribution from that non-distributed position.

In the recording system for TV broadcast programs of this embodiment, as described above, the streaming distribution is automatically stopped when a communication call or an abnormal change in terminal status of mobile communication device 20 has occurred, even when the streaming distribution is in progress. When the terminal status of the finished communication call or mobile communication device 20 is restored to a normal state, the non-distributed portion of the streaming is then distributed so that the user can avoid having to miss data that is in the process of being distributed.

The recording system for broadcast programs of the present invention is structured as described above. However the embodiments may employ variations or adaptations of different types.

In the first, second and third embodiments of the communication control device for example, the call detector portion 433 detects outgoing calls from the mobile communication device 20 to other communication parties 10, and incoming calls to the mobile communication device 20 from other communication parties 10 and notifies it portions in subsequent stages. However, instead of detecting incoming or outgoing calls in this way, the start of the actual communication call or data communication can be detected based on this incoming call or outgoing call and this detection may be reported to portions in subsequent stages.

In the first and second embodiments of the communication control device, when the call detector portion 433 detects an incoming or outgoing call, a recording command to record the TV broadcast program is automatically sent to the program recording device 30. In the third embodiment of the communication control device, the streaming distribution portion 442 automatically stops the streaming distribution. However, a manual recording mode may be installed in addition to or instead of this type of automatic recording mode and automatic distribution mode.

In the first and second embodiments of the communication control device, for example, when an incoming or outgoing call is detected, an inquiry is made to the user of the mobile communication device 20, asking whether or not to record the TV broadcast program. When the user commands recording, a command to record the TV broadcast program is sent. No command to record the TV broadcast program is sent when no recording command is made by the user. In the third embodiment, for example when an incoming or outgoing call is detected, an inquiry is made to the user of the mobile communication device 20 asking whether or not to stop the streaming distribution. When the user commands that streaming distribution stop, the streaming distribution is stopped and the distribution stream end position is recorded in the distribution end position recording portion 443. If the user does not command a stop to streaming distribution, then no recording is made on the distribution end position recording portion 443.

In the above description of the recording system for broadcast programs, the communication control device 40 and the program recording device 30 are comprised of devices installed separately and connected over the Internet 5. However, the program recording device 30 may also be integrated into a structure along with the communication control device 40.

The above description of the recording system for broadcast programs, described the recording of TV broadcast programs. However the same method may also be utilized to record for example all programs and information broadcast by the TV broadcast station 12 such as digital text broadcasts and digital music broadcasts.

What is claimed is:

1. A broadcast recording method utilizing a mobile terminal device having a broadcast signal receiving function and a mobile communication function, comprising:
    detecting an incoming or outgoing call during receiving of a broadcast signal;
    inquiring whether the broadcast signal should be recorded or not when an incoming or outgoing call is detected; and
    starting recording the broadcast signal in response to an input that commands recording,
    wherein the broadcast signal is recorded in a recording device installed in an external recording server in response to a request from the mobile terminal device via a mobile communication network accessible to the mobile communication function when an incoming or outgoing call is detected.

2. A broadcast recording method according to claim 1, further comprising:
    detecting termination of an incoming or outgoing call; and
    stopping recording of the broadcast signal when the termination of an incoming or outgoing call is detected.

3. A broadcast recording method according to claim 1, further comprising:
    detecting termination of an incoming or outgoing call; and
    playing back recorded broadcast signal information, when the termination of an incoming or outgoing call is detected.

4. A mobile terminal device comprising:
    a broadcast signal receiver for receiving a broadcast signal;
    a receiving-status detector for detecting a status of the broadcast signal receiving;
    a receiving signal recorder for recording broadcast information acquired from the received broadcast signal,
    a call detector for detecting an incoming or outgoing call, or termination of an incoming or outgoing call; and
    a recording-start/playback command information generating circuit for generating recording-start and playback command information,
    wherein the recording-start/playback command information generating circuit sends recording command information for recording the broadcast information to an external recording server via a mobile communication network when a broadcast signal receiving failure is detected by the receiving-status detector during receiving of the broadcast signal, sends recording command information for recording the currently received broadcast information to an external recording server via a mobile communication network when an incoming or outgoing call is detected by the call detector and notifies the receiving signal recorder about broadcast signal recording command information, and
    wherein the mobile terminal device further comprises:
    a playback information receiver for receiving playback information from the recording server via the communication network; and
    a playback portion for playing back the playback information,
    wherein the recording-start/playback command information generating circuit sends playback command information to stop playback of the broadcast information to the external recording server via the communication network when restoration of broadcast signal receiving is detected by the receiving status detector, sends playback command information to playback the broadcast information to the external recording server via the communication network when termination of a call is detected by the call detector and reports playback command information to the receiving signal recorder.

5. A mobile terminal device according to claim 4, wherein the recording-start/playback command information generating circuit sends the recording command information for recording the broadcast information to the external recording server via the communication network when the call detector detects an incoming or outgoing call and also when the receiving signal recorder cannot perform recording.

6. A broadcast recording system comprising an external recording server including a recording device and a mobile terminal device having broadcast signal functions and communication functions, wherein the recording server records broadcast information being received by the mobile terminal device when the mobile terminal device sends a command which requires recording of the broadcast information to the recording server when a failure of receiving is detected during receiving of the broadcast information by the mobile terminal device.

7. A broadcast recording system according to claim 6, wherein the recording server stops recording of the broadcast information when the mobile terminal device detects recovery of the receiving of the broadcast information.

8. A broadcast recording system according to claim 6, wherein the recording server records broadcast information currently received by the mobile terminal device when the mobile terminal device starts a call during the receiving of broadcast information.

9. A broadcast recording system according to claim 6, wherein the recording server stops recording of the broadcast information when the mobile terminal device stops communicating.

10. A program stored on a recording medium for implementing the broadcast recording method according to claim 1.

11. A recording medium holding a program for implementing the broadcast recording method of claim 1.

12. A mobile terminal device having a broadcast signal receiving function and a communication function, the device comprising:
- a detector; and
- a transmitter for transmitting a command signal, to an external recording server, to record a broadcast signal currently being recorded by a recording device installed in the mobile terminal device on the external recording server when the detector detects that the broadcast signal cannot be recorded in the recording device installed in the terminal device.

* * * * *